(12) United States Patent
Wu et al.

(10) Patent No.: US 12,475,895 B2
(45) Date of Patent: Nov. 18, 2025

(54) TRAINING A SPEECH VERIFICATION MODEL

(71) Applicant: HONOR DEVICE CO., LTD., Shenzhen (CN)

(72) Inventors: Biao Wu, Shenzhen (CN); Risheng Xia, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/264,783

(22) PCT Filed: Dec. 28, 2022

(86) PCT No.: PCT/CN2022/142677
§ 371 (c)(1),
(2) Date: Aug. 9, 2023

(87) PCT Pub. No.: WO2023/207185
PCT Pub. Date: Nov. 2, 2023

(65) Prior Publication Data
US 2025/0078841 A1    Mar. 6, 2025

(30) Foreign Application Priority Data
Apr. 29, 2022 (CN) .......... 202210468806.8

(51) Int. Cl.
*G10L 17/04* (2013.01)
*G10L 17/20* (2013.01)
*G10L 17/22* (2013.01)

(52) U.S. Cl.
CPC .............. *G10L 17/04* (2013.01); *G10L 17/20* (2013.01); *G10L 17/22* (2013.01)

(58) Field of Classification Search
CPC ................................ G10L 17/04; G10L 17/00
See application file for complete search history.

(56) References Cited

U.S. PATENT DOCUMENTS

2003/0088414 A1 * 5/2003 Huang .................... G10L 15/07
704/E15.011
2018/0366128 A1 12/2018 Liu et al.
(Continued)

FOREIGN PATENT DOCUMENTS

CN 108958810 A 12/2018
CN 111081260 A 4/2020
(Continued)

OTHER PUBLICATIONS

Huang et al., "Synth2Aug: Cross-Domain Speaker Recognition with TTS Synthesized Speech," 2021 IEEE Spoken Language Technology Workshop (SLT), Jan. 19, 2021, pp. 316-322.
(Continued)

*Primary Examiner* — Jialong He
(74) *Attorney, Agent, or Firm* — Fish & Richardson P.C.

(57) ABSTRACT

This application discloses a voiceprint recognition method, a graphical interface, and an electronic device. In the voiceprint recognition method, a voiceprint model is preset in the electronic device, and then the electronic device trains and updates the preset voiceprint model based on a voiceprint feature extracted from a voice of a registered user to obtain an exclusive voiceprint model belonging to the registered user. Finally, the electronic device uses the exclusive voiceprint model to generate a registered user representation based on the voiceprint feature of the voice of the registered user, and uses the registered user representation as a reference standard to realize voiceprint recognition on a voice of a speaker. Since the exclusive voiceprint model is trained based on voiceprint features of personal voices of the registered user, the registered user representation generated can accurately express voiceprint features of the user, thereby improving accuracy of voiceprint recognition.

18 Claims, 20 Drawing Sheets

(56) References Cited

U.S. PATENT DOCUMENTS

| | | | |
|---|---|---|---|
| 2019/0272831 A1* | 9/2019 | Kajarekar | G10L 17/06 |
| 2020/0043471 A1* | 2/2020 | Ma | G10L 15/07 |
| 2020/0110968 A1 | 4/2020 | Onodera | |
| 2021/0390959 A1 | 12/2021 | Jain et al. | |
| 2023/0206924 A1* | 6/2023 | Hsu | G10L 17/04 |
| | | | 704/200 |

FOREIGN PATENT DOCUMENTS

| | | |
|---|---|---|
| CN | 111048064 B | 7/2020 |
| CN | 111742361 A | 10/2020 |
| CN | 112289325 A | 1/2021 |
| CN | 112435673 A | 3/2021 |
| CN | 113241080 A | 8/2021 |
| CN | 113327620 A | 8/2021 |
| CN | 113707157 A | 11/2021 |
| CN | 113870860 A | 12/2021 |

OTHER PUBLICATIONS

Bird et al., "Overcoming Data Scarcity in Speaker Identification: Dataset Augmentation with Synthetic MFCCs via Character-level RNN," 2020 IEEE International Conference on Autonomous Robot Systems and Competitions (ICARSC), Apr. 15-16, 2020, pp. 146-151.

* cited by examiner

TRAINING A SPEECH VERIFICATION MODEL

CROSS-REFERENCE TO RELATED APPLICATIONS

This application is a national stage of International Application No. PCT/CN2022/142677, filed on Dec. 28, 2022, which claims priority to Chinese Patent Application No. 202210468806.8, filed on Apr. 29, 2022. The disclosures of the aforementioned applications are hereby incorporated by reference in their entireties.

TECHNICAL FIELD

This application relates to the field of terminals, and in particular, to a voiceprint recognition method, a graphical interface, and an electronic device.

BACKGROUND

Voices are widely used as unique information of users. For example, in a voiceprint recognition technology, an electronic device may extract a voiceprint feature from a voice of a speaker, use a preset voiceprint model to generate a speaker representation based on the extracted voiceprint feature, and then compare the speaker representation with a registered user representation (equivalent to a reference standard) to recognize whether the speaker is a registered user. At present, a same voiceprint model is preset in all electronic devices of a same type.

How to improve accuracy of voiceprint recognition is an urgent problem to be solved.

SUMMARY

This application provides a voiceprint recognition method, a graphical interface, and an electronic device. In the voiceprint recognition method, the electronic device may train and update a preset voiceprint model based on a voiceprint feature extracted from a voice of a registered user to obtain an exclusive voiceprint model belonging to the registered user. Finally, voiceprint recognition is performed by using the exclusive voiceprint model, thereby improving accuracy of voiceprint recognition.

According to a first aspect, this application provides a voiceprint recognition method, the method including: detecting, by an electronic device, a first voice instruction, and outputting a first result, the first result not indicating that voiceprint recognition is successful; and detecting, by the electronic device, a second voice instruction, and outputting a second result, the second result indicating that voiceprint recognition is successful; the first voice instruction and the second voice instruction both including a voiceprint feature of a user in a same state. The state of the user may be disturbed by any one or more of the following: time (age of the user), physiology, pathology, psychology, and an environment. The state of the user includes, but is not limited to, a first state and a second state. The first state refers to a state in which the user's physiological, pathological, and psychological states are all in a healthy, calm, and stable state and are not affected by the environment. For example, the first state includes, but is not limited to, a state when the use is resting on a bed. The second state means that any of the user's physiological, pathological, and psychological states is in an unhealthy, non-calm, and unstable state, which, for example, includes, but is not limited to, a state when the user is doing a vigorous exercise (cycling), has a throat lesion, or is emotionally tense and unstable. Voices outputted by the user in different states are different. For example, emotions and/or speech speeds of the voices are different. In other words, voiceprint features of the voices outputted by the user in different states are different. Voices respectively outputted in a same state are similar. For example, emotions and/or speech speeds of the voices are similar. In other words, voiceprint features of the voices outputted by the user in the same state are similar.

After the method according to the first aspect is implemented, voiceprint features of the user in various states can be accurately recognized, which can improve accuracy of voiceprint recognition. Inaccurate voiceprint recognition caused by a slight variation in the voiceprint feature of the user when the user is affected by the environment, psychology, pathology, and age is prevented.

With reference to the method according to the first aspect, after the detecting, by the electronic device, a second voice instruction, the method further includes: recognizing, by the electronic device, a voice corresponding to the second voice instruction, and performing a second operation corresponding to the voice; the second operation including any one of the following: waking up a voice assistant, controlling the voice assistant to perform a response operation, or logging in to an account of the user.

In this way, the electronic device, after successful voiceprint recognition of the user, can perform a corresponding operation according to a voice instruction of the user.

With reference to the method according to the first aspect, the electronic device includes a first voiceprint model, and before the detecting, by the electronic device, a second voice instruction, the method further includes: acquiring, by the electronic device, one or more third voices of the user; training the first voiceprint model based on the one or more third voices to obtain a second voiceprint model; and generating, by the electronic device, a first user representation (equivalent to a registered user representation generated by using an updated voiceprint model) according to a fourth voice of the user by using the second voiceprint model; the first user representation indicating a voiceprint feature of the user; where the second voiceprint model and the first user representation are used by the electronic device to perform voiceprint recognition on the second voice instruction.

In this way, the electronic device can accurately recognize voiceprint features of the user in various states by using the updated voiceprint model (the second voiceprint model), which can improve accuracy of voiceprint recognition. Inaccurate voiceprint recognition caused by a slight variation in the voiceprint feature of the user when the user is affected by the environment, psychology, pathology, and age is prevented.

With reference to the method according to the first aspect, before the training, by the electronic device, the first voiceprint model based on the one or more third voices, the method further includes: enabling, by the electronic device, a function for updating the first voiceprint model.

In this way, the user can actively input an operation to control the electronic device to update the voiceprint model, or the electronic device can automatically update the voiceprint model. Such a multi-trigger operation can provide convenience for the user.

With reference to the method according to the first aspect, before the training, by the electronic device, the first voiceprint model based on the one or more third voices, the method further includes: determining that the electronic device is in one or more of the following states: an idle state, a charging state, within a preset update time range, or a battery level being greater than a threshold.

In this way, the electronic device can update the voiceprint model without perception, so as to prevent an influence on the user's other operations on the electronic device. Determining whether the electronic device is in the idle state may be specifically determined by time detection and voice detection. For example, when it is detected that time is within a specific range (0:00 to 7:00 Beijing time) and it is detected by a microphone that ambient noise is lower than a threshold and there is no user voice, it is considered that the user is in a sleep state and is less likely to use the electronic device. Therefore, it is confirmed that the electronic device is in the idle state in this case. In another example, the electronic device may alternatively determine whether the electronic device is in the idle state by intelligently learning the user's habit of using the electronic device. In this way, the electronic device can update the voiceprint model without perception.

With reference to the method according to the first aspect, after the detecting, by the electronic device, a second voice instruction and before the outputting a second result indicating that voiceprint recognition is successful, the method further includes: acquiring, by the electronic device, a first voiceprint feature from the second voice instruction, obtaining a first speaker representation according to the first voiceprint feature by using the second voiceprint model, and determining that voiceprint recognition is successful only when it is determined that a first similarity between the first speaker representation and the user representation is greater than a first value.

In this way, the electronic device can use the updated voiceprint model to accurately recognize a voiceprint feature in a voice uttered by the user in each state.

With reference to the method according to the first aspect, before the training, by the electronic device, the first voiceprint model based on the one or more third voices, the method further includes: generating, by the electronic device, a second user representation (equivalent to a registered user representation generated by using a non-updated voiceprint model) according to a fifth voice of the user by using the first voiceprint model; the second user representation indicating a voiceprint feature of the user, the second user representation being different from the first user representation; and the acquiring, by the electronic device, one or more third voices of the user specifically includes: detecting, by the electronic device, a sixth voice; acquiring, by the electronic device, a second voiceprint feature from the sixth voice, and obtaining a second speaker representation according to the second voiceprint feature by using the first voiceprint model; and determining the corresponding sixth voice when a second similarity between the second speaker representation and the second user representation is greater than a second value as the third voice(s) of the first user.

In this way, the electronic device, before updating the voiceprint model, can perform voiceprint recognition by using the preset voiceprint model or a last updated voiceprint model, and the voice of the user on which voiceprint recognition is successful can be used as training data. The exclusive voiceprint model matching the user is obtained.

With reference to the method according to the first aspect, the training, by the electronic device, the first voiceprint model based on the one or more third voices to obtain a second voiceprint model specifically includes: acquiring, by the electronic device, a text corresponding to the third voice(s), and a third voiceprint feature in the third voice(s); generating, by the electronic device, one or more synthesized voices according to the text and the third voiceprint feature, a text corresponding to the synthesized voice(s) being the same as the text corresponding to the third voice(s), a similarity between a voiceprint feature of the synthesized voice(s) and the third voiceprint feature being greater than a third value; and training, by the electronic device, the first voiceprint model by using a training voice, to obtain the second voiceprint model; the training voice including: part or all of the one or more third voices and/or the one or more synthesized voices.

In this way, the electronic device, before updating the voiceprint model, can perform voiceprint recognition by using the preset voiceprint model or a last updated voiceprint model, and the voice of the user on which voiceprint recognition is successful can be used as training data. Moreover, a synthesized voice is generated based on the voice of the user on which voiceprint recognition is successful and is also used as the training data, so that a large amount of training data can be obtained in a short period of time, and efficiency of update of the voiceprint model can be improved.

With reference to the method according to the first aspect, the generating, by the electronic device, one or more synthesized voices according to the text and the third voiceprint feature specifically includes: generating, by the electronic device, the one or more synthesized voices according to a voice control parameter, the text and the third voiceprint feature; the voice control parameter including an emotion parameter and/or a speech speed parameter, an emotion of the synthesized voice(s) being the same as an emotion indicated by the emotion parameter, a text corresponding to the synthesized voice(s) being the same as the text corresponding to the third voice(s), a similarity between the voiceprint feature of the synthesized voice(s) and the third voiceprint feature being greater than a third value.

In this way, the electronic device, when acquiring the synthesized voice(s) as the training data of the model, can simulate voices outputted by the user in different emotions and states through the voice control parameter, so as to enrich types of the training data to obtain a more accurate voiceprint model, thereby accurately recognizing voiceprint features of the voices with different emotions and speech speeds outputted by the user in various states.

With reference to the method according to the first aspect, the training, by the electronic device, the first voiceprint model by using a training voice specifically includes: selecting, by the electronic device, part or all of the one or more third voices and/or the one or more synthesized voices according to a preset proportion as the training voice; where the preset proportion indicates proportions of voices with different emotions and/or speech speeds in the training data.

In this way, the problem of low accuracy of voiceprint recognition caused by emotional drift of the user can be further fundamentally solved, and performance of the voiceprint model can be improved.

With reference to the method according to the first aspect, a quantity of the synthesized voice(s) is a first quantity; the first quantity being determined by the electronic device according to the second similarity, a lower second similarity indicating a greater first quantity.

In this way, when the similarity between the second speaker representation corresponding to the third voice(s) of the user and the second user representation is greater than the threshold and is large, which indicates that the voiceprint model in this case can accurately recognize the voice of the user, there is not much room for improvement of performance of the model updated by acquiring training data based on the voice of the registered user. Conversely, when the similarity between the second speaker representation corresponding to the third voice(s) of the user and the second user representation is greater than the second value but small, which indicates that, although the voiceprint model in this case can recognize the voiceprint feature of the voice of the user, voiceprint recognition may be inaccurate if the user utters another voice that is slightly different from the previous third voice(s), there is a lot of room for improvement of performance of the model updated by the voiceprint model in this case by acquiring training data based on the third voice of the user.

With reference to the method according to the first aspect, after the detecting, by the electronic device, a second voice instruction, the method further includes: determining, by the electronic device, a text of the second voice instruction as a specific text, the specific text including one or more of the following: the wakeup word, a word corresponding to a preset voice instruction, and a word inputted by voice during account login.

In this way, update of the voiceprint model caused by collection of voices of the user as the training voice by the electronic device due to accidental triggering by a voice uttered by the user at will can be prevented.

With reference to the method according to the first aspect, the fourth voice includes one or more of the following voices: the third voice, the fifth voice, and a voice that the electronic device prompts the user to actively register.

In this way, the electronic device, when regenerating the user representation by using the updated second voiceprint model, can extract a voiceprint feature according to the training voice, or according to a registered voice previously inputted when voiceprint registration is performed by using a non-updated first voiceprint model, or according to a voice inputted when the user re-performs voiceprint registration, to obtain a new user representation.

According to a second aspect, this application provides an electronic device. The electronic device includes: one or more processors, one or more memories, and a display screen; the one or more memories being coupled to the one or more processors, the one or more memories being configured to store computer program code, the computer program code including a computer instruction, the one or more processors, when executing the computer instruction, causing the electronic device to perform the method as described in any one of the first aspect.

According to a third aspect, this application provides a computer-readable storage medium. The computer-readable storage medium includes a computer instruction, the computer instruction, when run on an electronic device, causing the electronic device to perform the method as described in any one of the first aspect.

According to a fourth aspect, this application provides a chip or chip system. The chip or chip system includes a processing circuit and an interface circuit, the interface circuit being configured to receive a code instruction and transmit the code instruction to the processing circuit, the processing circuit being configured to execute the code instruction to perform the method as described in any one of the first aspect.

DESCRIPTION OF EMBODIMENTS

Figure 1:
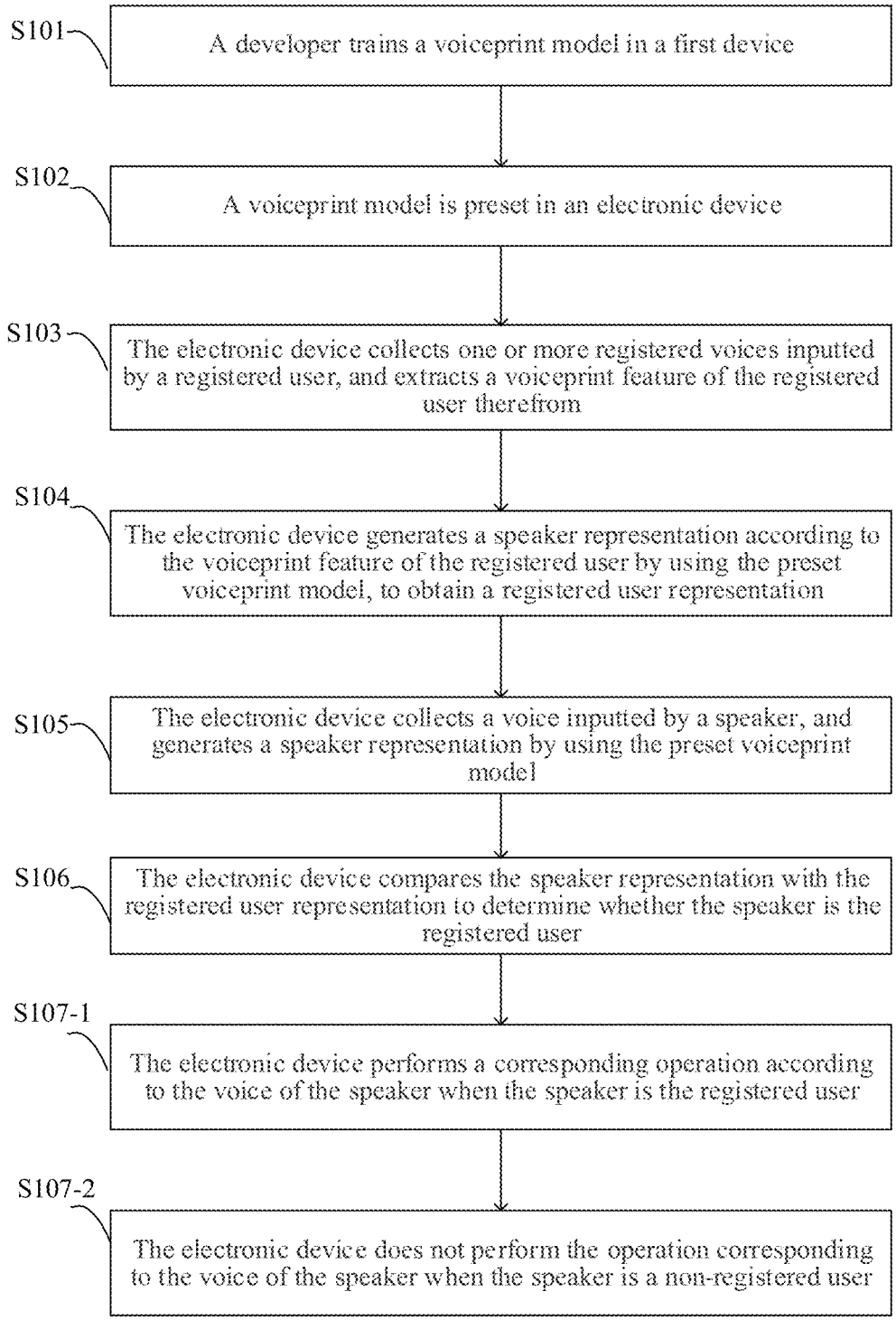
FIG. 1 is a flowchart of a voiceprint recognition method.

The following clearly and thoroughly describes technical solutions in embodiments of this application with reference to the accompanying drawings. In the descriptions of the embodiments of this application, "/" means "or" unless otherwise specified. For example, A/B may represent A or B. The term "and/or" in the text describes only an association relationship for describing associated objects and represents that three relationships may exist. For example, A and/or B may represent the following three cases: only A exists, both A and B exist, and only B exists.

The terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more.

"Embodiment" mentioned in this application means that particular features, structures, or characteristics described with reference to the embodiment may be included in at least one embodiment of this application. The phrase appear at various locations in this specification may neither necessarily mean a same embodiment, nor mean an independent or optional embodiment exclusive from another embodiment. It is explicitly and implicitly understood by a person skilled in the art that the embodiments described in this application may be combined with another embodiment.

The term "user interface (user interface, UI)" in the following embodiments of this application is a medium interface for interaction and information exchange between an application or an operating system and a user, and implements conversion between an internal form of information and a form acceptable to the user. The user interface is source code written in a specific computer language such as java and an extensible markup language (extensible markup language, XML). The interface source code is parsed and rendered on an electronic device, and finally presented as user-recognizable content. A common representation form of the user interface is a graphic user interface (graphic user interface, GUI), which is a graphically displayed user interface related to a computer operation. The user interface may be a visual interface element such as a text, an icon, a button, a menu, a tab, a text box, a dialog box, a status bar, a navigation bar, or a Widget that is displayed on a display screen of the electronic device.

A voiceprint refers to a sound wave spectrum that carries speech information, which is a biological feature formed by more than a hundred characteristic dimensions such as wavelength, frequency, and intensity, and is featured with uniqueness, relative stability, measurability, and variability.

The uniqueness means that voice production is a complex physiological and physical process between a human language center and a vocal organ. The vocal organ of each person varies greatly in size and shape, so different persons have different voiceprints.

The relative stability means that in each stage (such as adolescence, middle age, and old age), the development of the human language center and the vocal organ is stable, and a human voiceprint can remain relatively stable for a long time.

The measurability means that a voiceprint feature can be extracted from a voice through a technical means. The voiceprint feature is a feature used for characterizing a voiceprint of a person. The voiceprint feature includes, but is not limited to, an acoustic feature (such as a spectrum, a cepstrum, a formant, a fundamental frequency, energy, and a reflection coefficient), a morphological feature (a speaker-related word n-gram or phoneme n-gram), a prosodic feature, and the like. A specific type of the voiceprint feature is not limited in this application, but the acoustic feature is mainly used.

The variability means that a voiceprint of a person may be disturbed by time, physiology, pathology, psychology, and an environment.

Therefore, based on the uniqueness, the stability, the measurability, and the like of the voiceprint, identity of a speaker can be determined by using a voiceprint recognition technology, that is, by extracting a voiceprint feature from a voice of the speaker.

Referring to FIG. 1, FIG. 1 is a flowchart of a voiceprint recognition method.

As shown in FIG. 1, the voiceprint recognition method includes the following steps:

S101: A developer trains a voiceprint model in a first device.

Step 1: Voiceprint features of a plurality of users are inputted into an initial voiceprint model to obtain a plurality of preliminary speaker representations. Then, the first device also needs to determine whether a plurality of speaker representations corresponding to a plurality of voiceprint features that actually belong to a same speaker can be classified into one category.

Step 2: If the plurality of speaker representations corresponding to the plurality of voiceprint features that actually belong to the same speaker can be classified into one category, it indicates that the initial voiceprint model is a finally trained voiceprint model. Otherwise, part or all of parameters of the initial voiceprint model are modified, and voiceprint features of voices of a plurality of same users are continuously inputted into the modified voiceprint model, to obtain a plurality of speaker representations outputted by the modified model. Then, if a plurality of speaker representations corresponding to a plurality of voiceprint features that actually belong to a same speaker can be classified into one category, it indicates that the modified voiceprint model is a finally trained voiceprint model. Otherwise, the voiceprint model is continuously modified and the above steps are repeated until a plurality of speaker representations meeting a condition that a plurality of speaker representations corresponding to a plurality of voiceprint features that actually belong to a same speaker can be classified into one category are obtained.

A condition for classifying the above speaker representations into one category is that a difference between two speaker representations is less than a threshold (also called a second value). The comparison that the difference between the two speaker representations is less than the threshold can be specifically realized by using a classification model. The classification model can classify the speaker representations based on the difference between the two speaker representations.

The above speaker representation refers to: a speaker representation generated according to some information extracted from a voiceprint feature extracted from a voice outputted by a user. The speaker representation can identify identity of a speaker.

S102: A voiceprint model is preset in an electronic device.

Specifically, the voiceprint model trained in S101 is preset in the electronic device.

Before the electronic device leaves a factory, the developer pre-stores the voiceprint model trained in the first device in the electronic device. Alternatively, after the electronic device leaves the factory, the developer may send a voiceprint model to the electronic device through the first device, and the electronic device receives and stores the voiceprint model.

In some embodiments, the first device and the electronic device are different devices. The first device is a device used by the developer for research and development, including, but not limited to, a server, a computer, a notebook computer, and the like. The electronic device is an end-side device used by the user. In some other embodiments, the first device may be a same device as the electronic device. In this way, the voiceprint model is always stored in the electronic device after the voiceprint model is trained in the electronic device.

S103: The electronic device collects one or more registered voices inputted by a registered user, and extracts a voiceprint feature of the registered user therefrom.

Specifically, the electronic device may collect the registered voice(s) inputted by the registered user through a microphone, and extract one or more corresponding voiceprint features from the one or more registered voices.

The registered user herein is only a name, which does not mean that the registered user has completed voiceprint registration. The registered user successfully completes voiceprint registration only after the electronic device performs S103 and S104 below according to the registered voice(s) inputted by the registered user.

There may be one or more registered users, including, but not limited to, an owner of the electronic device, family members of the owner, and the like.

The registered voice of the registered user refers to a voice corresponding to, for example, a wakeup word or another preset word that the registered user needs to input into the electronic device when enabling a voiceprint recognition function of the electronic device. The registered voice is used by the electronic device to generate a registered user representation, so as to be used as a reference representation during subsequent voiceprint recognition. In this application, the registered user representation generated by the preset voiceprint model may also be called a second user representation.

S104: The electronic device generates a speaker representation according to the voiceprint feature of the registered user by using the preset voiceprint model, to obtain a registered user representation.

When the registered user has one voiceprint feature, the electronic device may input the voiceprint feature into the preset voiceprint model to obtain a corresponding speaker representation. The speaker representation may be used for identifying identity of the registered user. Therefore, the speaker representation will be replaced with the registered user representation in the following.

When the registered user has a plurality of voiceprint feature, the electronic device may input the plurality of voiceprint features into the preset voiceprint model to obtain a plurality of corresponding speaker representations. Then, the electronic device fuses the plurality of speaker representations to obtain a final speaker representation. The final speaker representation may be used for identifying the identity of the registered user. Therefore, the final speaker representation will be replaced with the registered user representation in the following.

Finally, the electronic device stores the registered user representation in a voiceprint model database to provide a reference standard for subsequent voiceprint recognition.

S105: The electronic device collects a voice inputted by a speaker, and generates a speaker representation by using the preset voiceprint model.

In this application, the speaker representation generated by the preset voiceprint model may also be called a second speaker representation.

S106: The electronic device compares the speaker representation with the registered user representation to determine whether the speaker is the registered user.

S107-1: The electronic device performs a corresponding operation according to the voice of the speaker when the speaker is the registered user.

S107-2: The electronic device does not perform the operation corresponding to the voice of the speaker when the speaker is a non-registered user.

As can be known based on the voiceprint recognition method shown in FIG. 1, in the voiceprint recognition method, the speaker representation corresponding to the voiceprint feature of the speaker is generated always through the preset voiceprint model in the electronic device, and the speaker representation is compared with the registered user representation (equivalent to the reference standard) to determine whether the speaker is a registered person. However, the use of the preset voiceprint model may have the following problems:

The preset voiceprint model has a too low generalization capability, which can only meet general requirements of a large number of users, but cannot meet all requirements of any user. This is because voiceprint features extracted from voices of a plurality of users are used as training data when the preset voiceprint model is trained, so that the trained voiceprint model is affected by the voiceprint feature of each user in the large number of users. However, for a user using the preset voiceprint model, the user utters voices with different emotions and speech speeds in different states.

When identity of the user is identified through the preset voiceprint model, performance of the model is poor, sometimes a voiceprint recognition result may be accurate, and sometimes the voiceprint recognition result may be inaccurate. This is because the preset model can extract, through massive user data training, different parts of user voiceprint information for training, so that speakers can be distinguished. However, for a new user not in a training set, it is unknown whether his voiceprint difference information can be accurately extracted by the preset model. In addition, the user's voiceprint information may change over time and with emotions, which poses a strong challenge to the preset model, making it difficult to achieve an optimal effect for a certain user and to accurately recognize a voiceprint feature in a voice uttered by the user in each state.

To address the above problem and improve accuracy of voiceprint recognition, embodiments of this application provide a voiceprint recognition method, a graphical interface, and an electronic device. In the voiceprint recognition method, in the method, a preset voiceprint model is stored in the electronic device, and the electronic device may train the preset voiceprint model according to a voice of a registered user to obtain a new voiceprint model. Then, the electronic device obtains a registered user representation of the user through the new voiceprint model by using a registered voice of the registered user. Afterwards, the electronic device collects a voice inputted by a speaker, compares a speaker representation of the speaker with the registered user representation, determines that the speaker is the registered user if a similarity is greater than a threshold (also called a first value), and determines that the speaker is a non-registered user if the similarity is less than the threshold.

In this application, the registered user representation generated by the updated new voiceprint model may also be called a first user representation. The speaker representation generated by the updated new voiceprint model may also be called a first speaker representation.

In some embodiments of this application, after the electronic device trains the preset voiceprint model and obtains a new voiceprint model, the electronic device may also retrain the new voiceprint model according to the voice of the registered user to obtain an updated voiceprint model. In this case, the voice of the registered user is a voice uttered by the speaker when the speaker is determined as the registered user by using the new voiceprint model. In this application, the preset voiceprint model and the last updated model may also be called a first voiceprint model, and a newly updated voiceprint model may also be called a second voiceprint model.

In some embodiments of this application, if there are a plurality of registered users, the electronic device may generate a new exclusive voiceprint model for each user according to a voice of each registered user, to achieve accuracy of voiceprint recognition for a plurality of registered users in one electronic device.

In some embodiments of this application, the electronic device, after replacing the preset voiceprint model with the updated voiceprint model, may continue to collect voices of the registered user and re-update the last updated model in real time.

In some embodiments of this application, the electronic device, when training the voiceprint model according to the voice of the registered user, may specifically select voices of the registered user in different states to train the voiceprint model.

In some embodiments of this application, the electronic device, when training the voiceprint model according to the voice of the registered user, may specifically select the voices of the registered user in different states according to a type ratio to train the voiceprint model.

In some embodiments of this application, the electronic device may perform voiceprint recognition in various scenarios by using the updated voiceprint model. The usage scenarios include, but are not limited to, waking up the device, logging in to an account, performing a corresponding operation according to a voice instruction, and the like. The electronic device, if recognizing that a current speaker is the registered user, may perform a corresponding operation, such as waking up the device, logging in to an account, performing a corresponding operation according to a specific voice instruction, or the like. The electronic device, if recognizing that the current speaker is a non-registered user, does not perform the corresponding operation, so as to protect the electronic device from malicious use by others.

Custom terms involved in the above content are explained in the following:

The preset voiceprint model is a voiceprint model pre-trained by the developer and stored in the electronic device. A function of the preset voiceprint model may be obtained with reference to the description of step S101 above.

The registered voice of the registered user refers to a voice corresponding to, for example, a wakeup word that the registered user needs to input to the electronic device or another word preset by the electronic device when a voiceprint recognition or voice wakeup function of the electronic device is enabled for example. Alternatively, the registered voice of the registered user may be a voice account password entered when a user account is registered with the electronic device. A specific word corresponding to the registered voice of the registered user is not limited in this application.

The voice of the registered user refers to a voice inputted by the registered user into the electronic device and a voice from which the electronic device may extract a voiceprint feature as input data of the preset voiceprint model or the updated voiceprint model.

Specifically, the voice of the registered user includes, but is not limited to, a registered voice inputted by the registered user, and a voice inputted by the registered user during use of the electronic device. The latter may be a wakeup word inputted by the registered user, a voice instruction, a verification voice inputted during account login, or a voice collected within a scope of authorization of the user and inputted by the user in daily life.

The speaker representation refers to a speaker representation generated according to some information extracted from a voiceprint feature extracted by the electronic device from a collected voice of the speaker in a situation other than the voiceprint registration process. The speaker representation can identify identity of the speaker. In this application, the speaker representation may also be called a speaker template vector, a speaker voiceprint template vector, or the like.

The registered user representation refers to a registered user representation generated according to some information extracted from a voiceprint feature extracted by the electronic device from a collected voice of the registered user in the voiceprint registration process. The registered user representation can identify identity of the registered user. In this application, the registered user representation may also be called a registered user template vector, a registered user voiceprint template vector, or the like.

Therefore, the implementation of the voiceprint recognition method, the graphical interface, and the electronic device according to this application brings the following beneficial effects:

(1) The electronic device trains the preset voiceprint model according to the voice of the registered user to obtain the exclusive voiceprint model for the registered user, and then accuracy of voiceprint recognition can be improved by using the exclusive voiceprint model, thereby improving user experience.

(2) The electronic device, after replacing the preset voiceprint model with the updated voiceprint model, may continue to collect voices of the registered user and re-update the last updated model in real time. In this way, the problem of low accuracy of voiceprint recognition due to a change in a user voiceprint feature of the registered user in different states, such as before and after throat inflammation caused by a pathological reason can be prevented.

(3) The electronic device selects voices of the registered user in different states (such as different emotions or different speech speeds) to train the voiceprint model. Therefore, the problem of low accuracy of voiceprint recognition caused by voice emotion drift of the user can be solved, and performance of the voiceprint model can be improved.

(4) The electronic device selects the voices of the registered user in different states according to a type ratio to train the voiceprint model. The type ratio may be determined according to frequencies corresponding to the user's speaking in different states in daily life. For example, if a frequency ratio of the user's speaking in a normal state (also called a first state) to that in an abnormal state (also called a second state) is 1.2:1, the electronic device may select the voices of the registered user according to the type ratio of 1.2:1 to train/adjust the voiceprint model. Therefore, the problem of low accuracy of voiceprint recognition caused by emotional drift of the user can be further fundamentally solved, and performance of the voiceprint model can be improved.

(5) The electronic device may perform voice recognition in various scenarios by using the updated voiceprint model, which extends a range of application of voiceprint recognition according to this application.

The voiceprint recognition method according to this embodiment of this application is described below with reference to UI embodiments.

Figure 2:
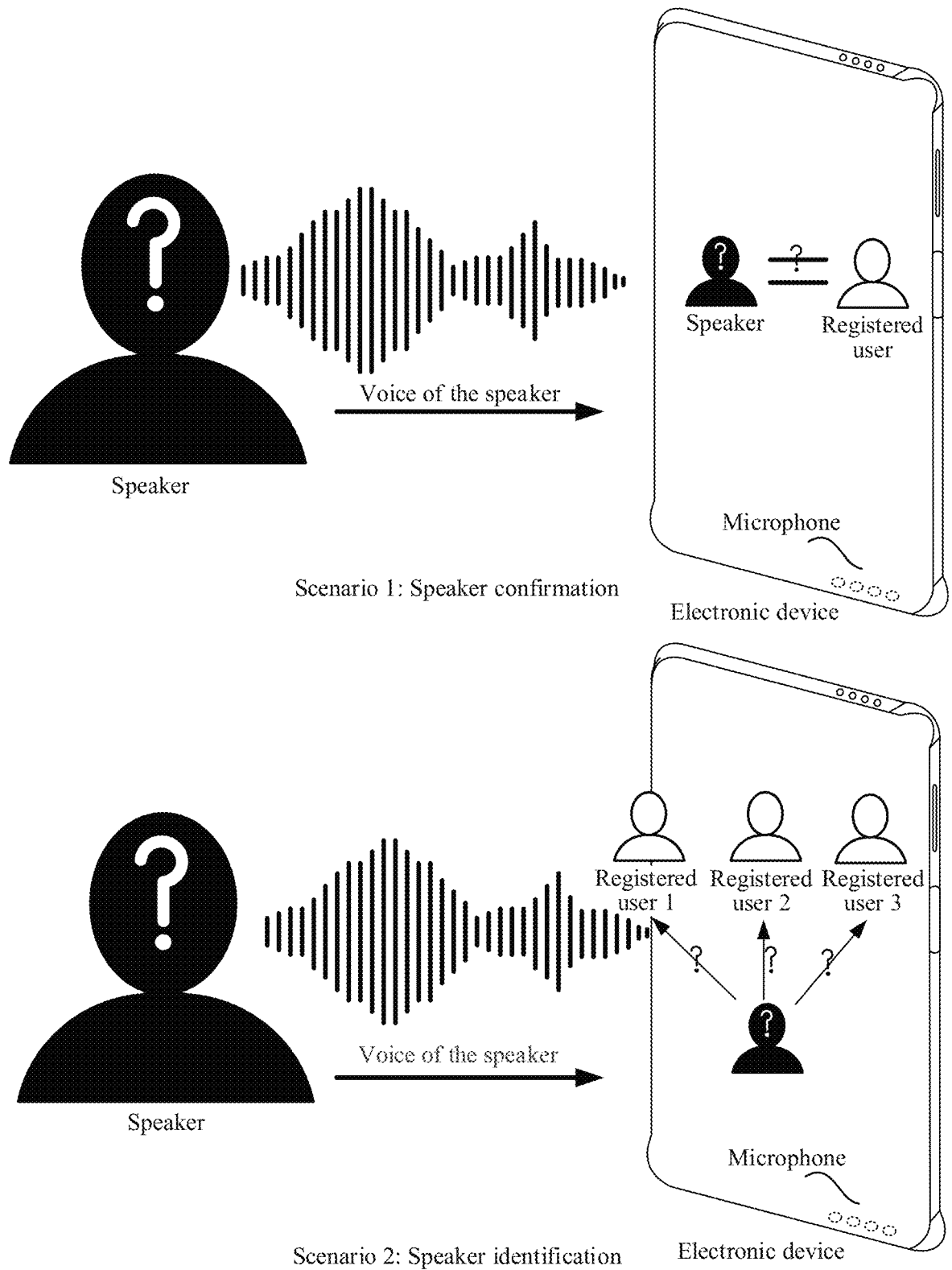
FIG. 2 is a schematic diagram of a voiceprint recognition scenario according to an embodiment of this application.

Referring to FIG. 2, FIG. 2 exemplarily illustrates a schematic diagram of a typical application scenario of a voiceprint recognition method according to this application.

As shown in FIG. 2, the application scenario of the voiceprint recognition method according to this application includes, but is not limited to, scenarios such as speaker confirmation and speaker authentication. The application scenario of speaker confirmation means that, when there is one registered user in the electronic device, the electronic device confirms whether the speaker is the registered user. The application scenario of speaker authentication means that, when there are a plurality of registered users in the electronic device, the electronic device confirms whether the speaker is a registered user and is which one of the plurality of registered users.

Referring to FIG. 3A to FIG. 3E, FIG. 3A to FIG. 3E exemplarily illustrate schematic diagrams of a series of user interfaces during voiceprint registration.

The voiceprint registration means that the registered user inputs a voice into the electronic device, and the electronic device may extract a voiceprint feature corresponding to the voice and then use the preset voiceprint model to model the voiceprint feature of the registered user to obtain a registered user representation of the registered user.

Figure 3A:
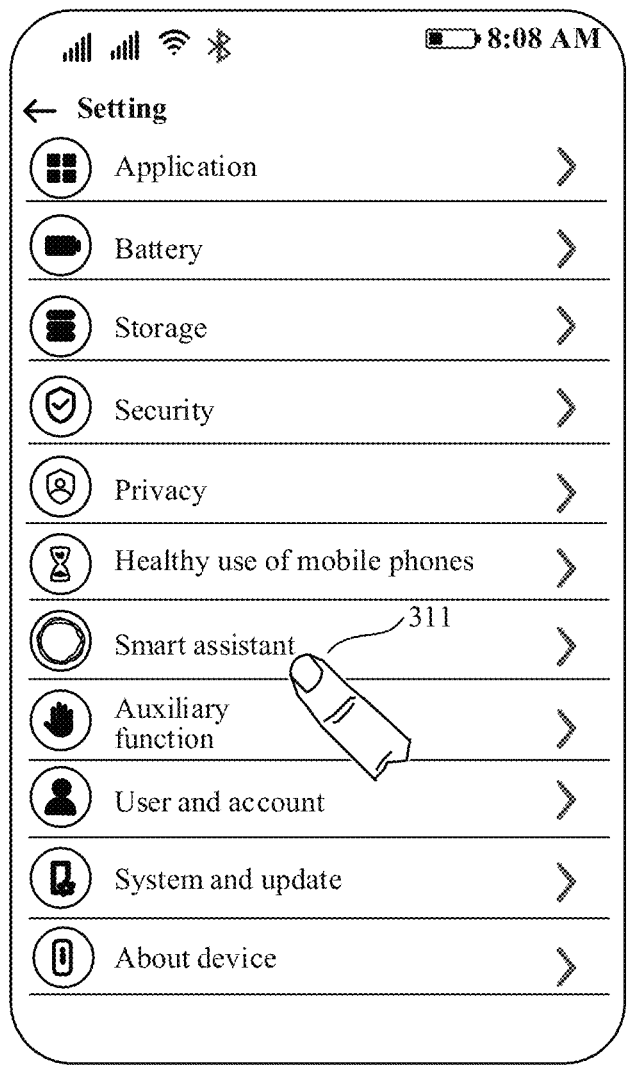
FIG. 3A to FIG. 3E are schematic diagrams of a group of voiceprint registration user interfaces according to an embodiment of this application.

As shown in FIG. 3A, a user interface 310 displayed by the electronic device is a setting interface, and there are a plurality of setting options displayed on the setting interface, including a smart assistant option 311. When an operation on the smart assistant option 311 is detected in the electronic device, the electronic device displays a user interface 320 shown in FIG. 3B in response to the operation.

Figure 3B:
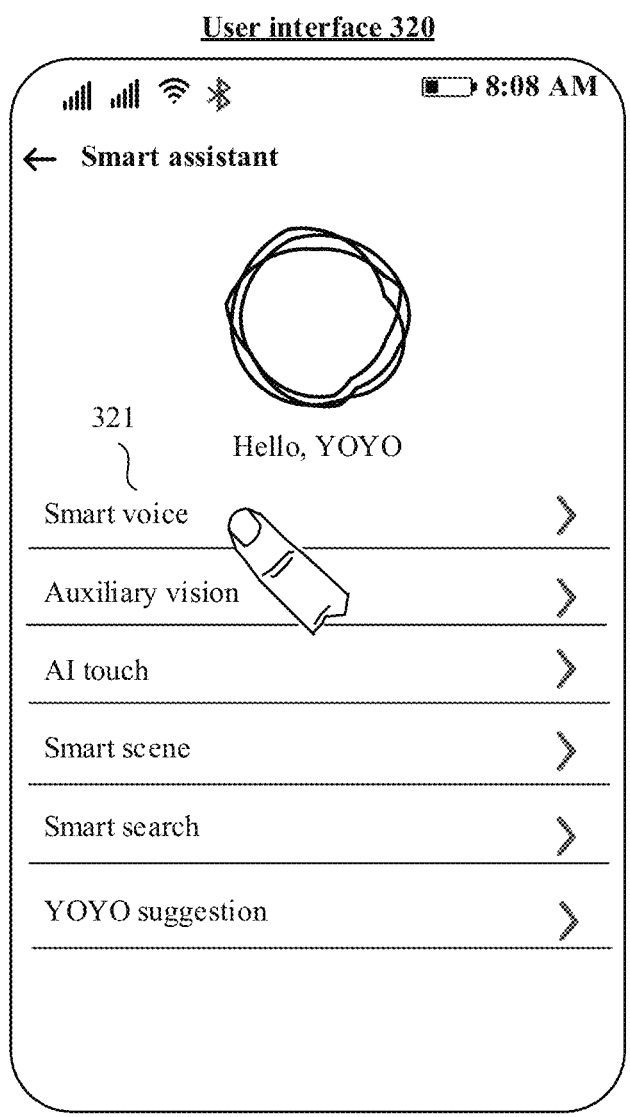

As shown in FIG. 3B, the user interface 320 is a details page of a smart assistant, and a series of function options provided by the smart assistant, such as a smart voice option 321, are displayed on the details page of the smart assistant. When an operation on the smart voice option 321 is detected in the electronic device, the electronic device displays a user interface 330 shown in FIG. 3C in response to the operation.

Figure 3C:
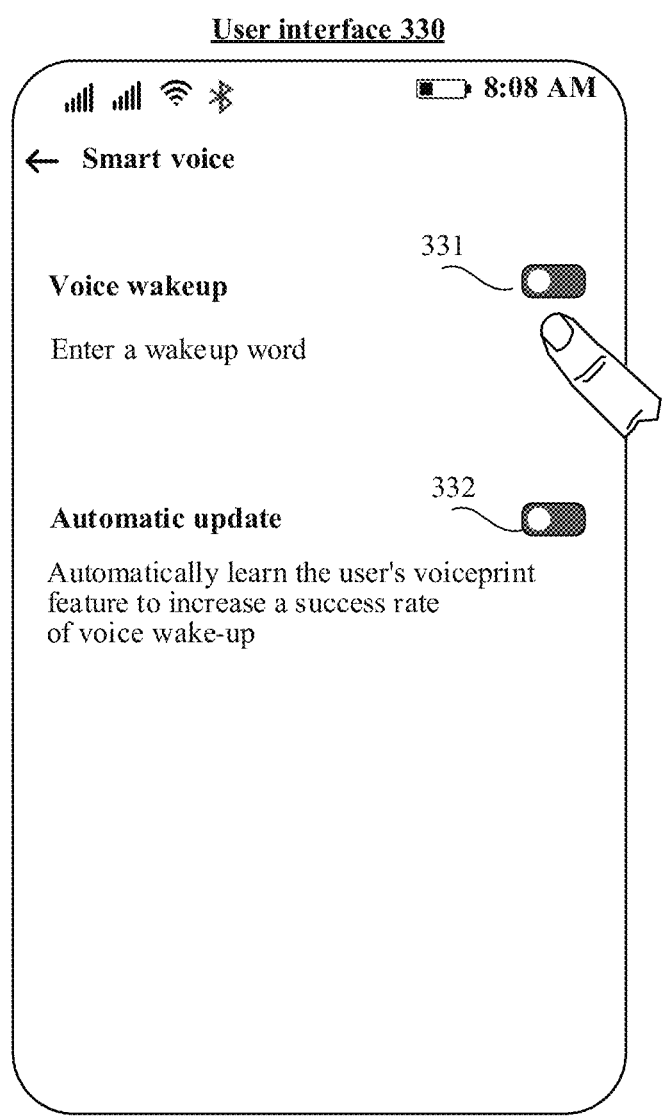

As shown in FIG. 3C, a switch control 331 corresponding to voice wakeup and a switch control 332 corresponding to automatic update are disposed on the user interface 330. In this case, both the switch control 331 and the switch control 332 remain in an off state.

In some embodiments of this application, when both the switch control 331 and the switch control 332 remain in the off state, the electronic device may receive a user operation to enable a voice wakeup function or an automatic update function. In some other embodiments of this application, the switch control 331 and the switch control 332 may remain in an on state by default, which is not limited in the embodiments of this application.

The voice wakeup or automatic update in FIG. 3C is only an optional name of the corresponding function, which is not limited in the embodiments of this application. The functions respectively corresponding to voice wakeup and automatic update are specifically described in detail below. In some other embodiments of this application, the voice wakeup may also be called voice activation, a voice call, a voice service, or the like, and the automatic update may also be called a smart service, smart voiceprint recognition, smart voiceprint recognition, or the like.

The voice wakeup means that a user, after enabling the voice wakeup function and entering a wakeup word, may wake up the smart assistant of the electronic device by inputting a voice corresponding to the wakeup word, so as to provide a convenient service for the registered user. The automatic update means that the electronic device may learn and register, in real time, a voice inputted by the user, and perform voiceprint model training based on a large amount of voice data and update the previous voiceprint model, so as to provide the user with a more accurate voiceprint recognition function and increase a wakeup success rate of the electronic device.

Figure 3D:
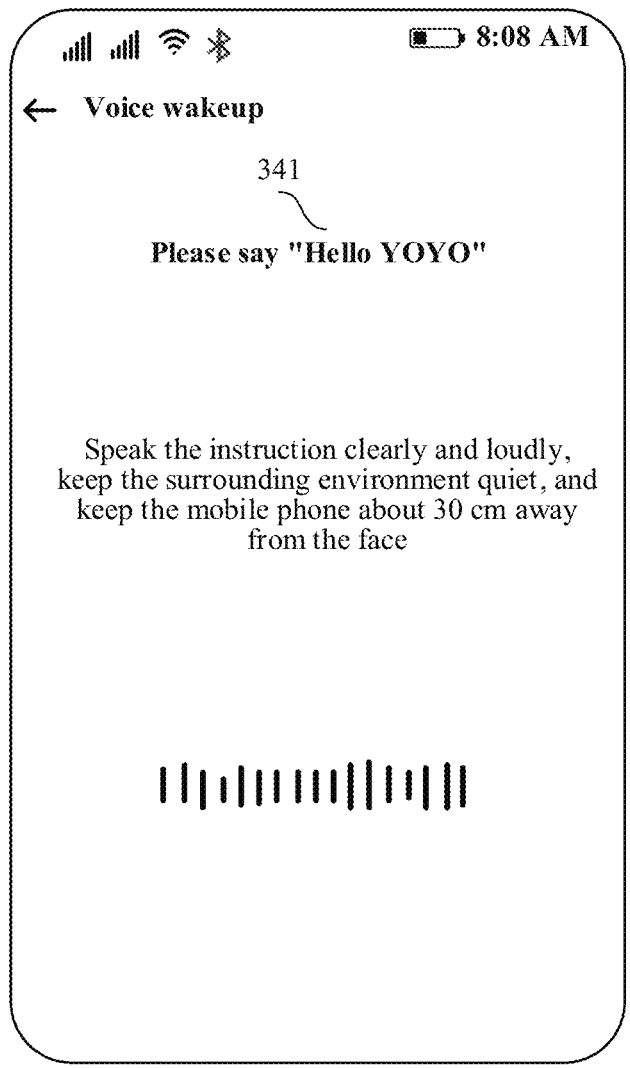

When the electronic device detects an operation on the switch control 331 corresponding to the voice wakeup, the electronic device displays a user interface 340 shown in FIG. 3D in response to the operation.

As shown in FIG. 3D, the user interface 340 is a wakeup word entry interface, and prompt information 341 for wakeup word entry is displayed on the interface. For example, please say "Hello YOYO". This application uses a default wakeup word "Hello YOYO" of the electronic device as an example for illustration. In some other embodiments of this application, the wakeup word may alternatively be defaulted to something else such as "Hey YOYO", or customized by the user, which is not limited in the embodiments of this application.

After the user clearly says "Hello YOYO" in the user interface 340 according to the prompt information, the electronic device may collect the voice through a microphone, extract a corresponding voiceprint feature from the voice, and input the voiceprint feature into the preset voiceprint model. The preset voiceprint model may output a registered user representation corresponding to the registered user, and store the registered user representation in a voiceprint model database. The registered user representation can identify identity of the registered user. Then, the electronic device may display a user interface 350 shown in FIG. 3E to prompt the user that the voice wakeup function has been enabled.

Figure 3E:
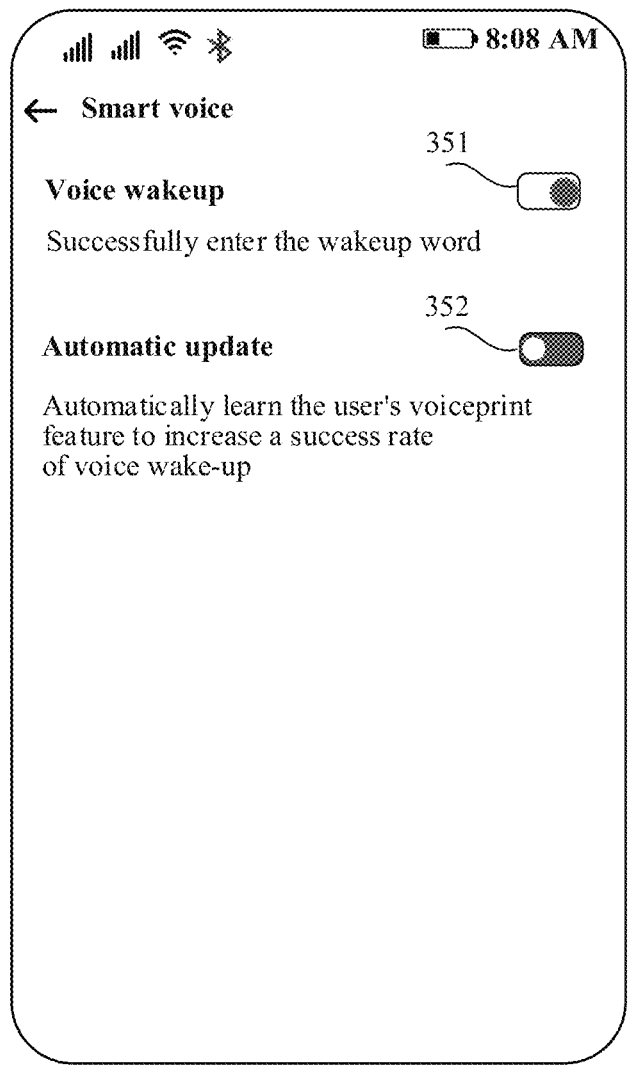

As shown in FIG. 3E, the user interface 350 is similar to the user interface 330 shown in FIG. 3C, and a difference is that a state of the switch control 351 corresponding to the voice wakeup is the on state, and a state of the switch control 352 corresponding to the automatic update is still the off state.

It may be understood that the above is only an example of a process of performing voiceprint registration by one user, and in some other embodiments, the electronic device may alternatively support a plurality of users to register voiceprints at the same time and then respectively create and store registered user representations for the plurality of users. A process of performing voiceprint registration by the plurality of users may be specifically obtained with reference to the process of performing voiceprint registration by one user above. Details are not described herein.

It is to be noted that FIG. 3A to FIG. 3E are only an example of a method for registering a voiceprint according to this application, and the content included in the user interfaces shown in FIG. 3A to FIG. 3E is only an example and should not constitute a limitation on this application. In some other embodiments of this application, the above user interfaces may alternatively include more or less content. In some other embodiments of this application, the user may alternatively enable the voice wakeup function by pulling down a menu bar.

Figure 4A:
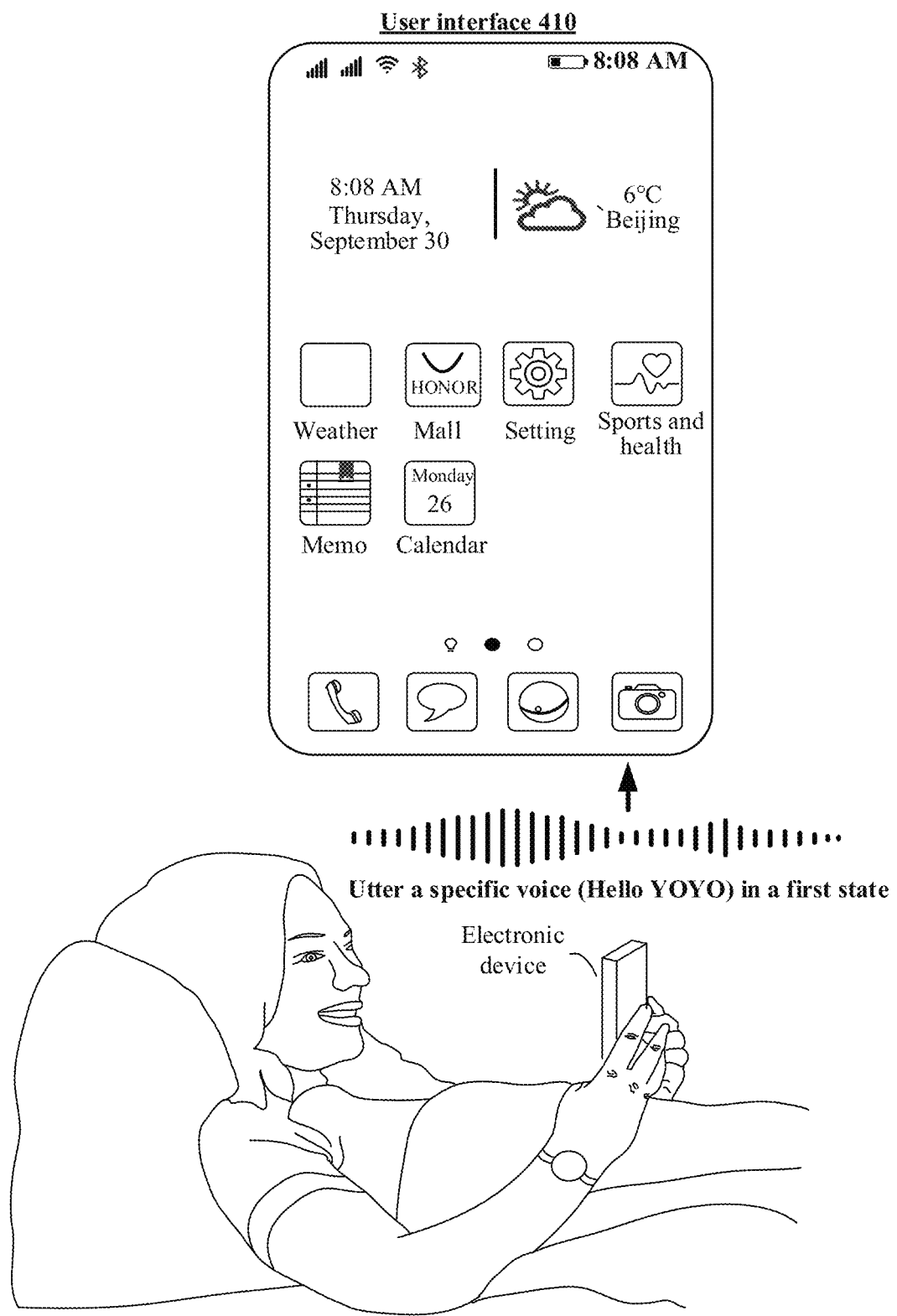
FIG. 4A to FIG. 4B are schematic diagrams of a group of user interfaces when a registered user performs a voice test in a first state according to an embodiment of this application.
Figure 4B:
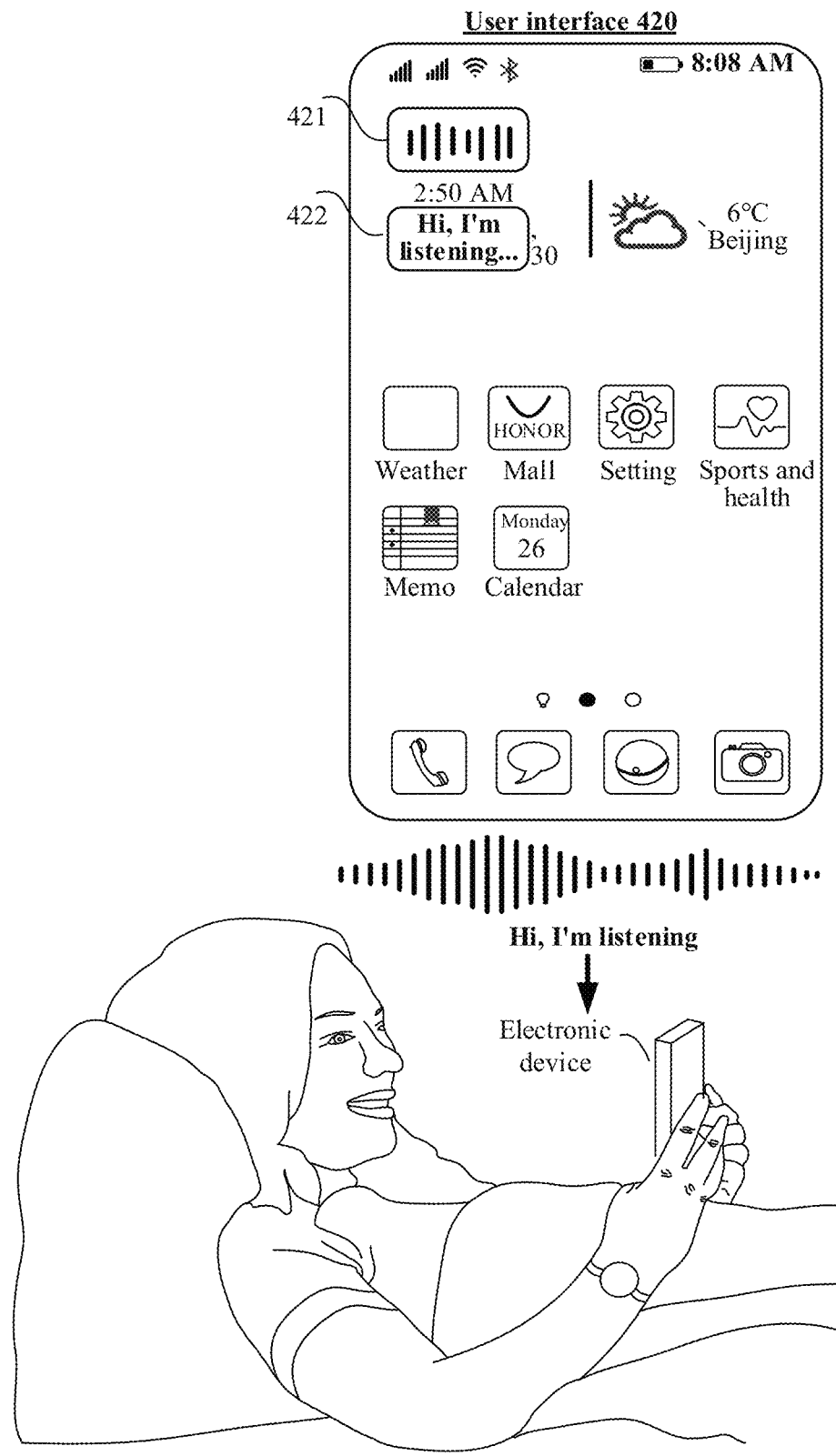

Referring to FIG. 4A to FIG. 4B, FIG. 4A to FIG. 4B exemplarily illustrate schematic diagrams of a group of user interfaces when the registered user performs a voice test in the first state.

The voice test means that, when there is one registered user, after voiceprint registration is successful, the speaker inputs a specific voice into the electronic device to trigger the electronic device to extract a voiceprint feature of the specific voice and compare the extracted voiceprint feature with a registered user representation of the registered user stored in the electronic device, so as to confirm whether identity of the speaker is the registered user. When there are a plurality of registered users, the electronic device may alternatively compare the extracted voiceprint feature with registered user representations of the plurality of registered user stored in the electronic device respectively, so as to identify which registered user the current speaker is.

The above specific voice refers to a voice corresponding to a specific text. The specific text includes, but is not limited to, a wakeup word entered during voiceprint registration, a multi-command word preset by the electronic device, and the like. Introduction to the wakeup word and the multi-command word may be specifically obtained with reference to the foregoing. Details are not described herein. The speaker includes a registered user and a non-registered user.

Referring to FIG. 4A, FIG. 4A exemplarily illustrates a schematic diagram of an operation that the registered user outputs a wakeup word in the first state.

As shown in FIG. 4A, it is assumed that the registered user inputs a specific voice into the electronic device in the first state, and the first state means that the user's physiological, pathological, and psychological states are all in a healthy, calm, and stable state and are not affected by an environment. The first state includes, but is not limited to, a state when the user is resting on a bed. Therefore, in this case, in response to the wakeup word inputted by the registered user, the electronic device may wake up a smart voice assistant "YOYO" of the electronic device in response to the detected specific voice, and switch an originally displayed user interface 410 shown in FIG. 4A to a displayed user interface 420 as shown in FIG. 4B.

Referring to FIG. 4B, FIG. 4B exemplarily illustrates a schematic diagram of a user interface displayed by the electronic device in response to the wakeup word inputted by the registered user.

As shown in FIG. 4B, the user interface 420 is a voice control interface, and a voice recognition icon 421 and a voice prompt box 422 are disposed on the interface. The voice recognition icon 421 is used for prompting the user that the electronic device has woken up the smart voice assistant, and the voice prompt box 422 is used for displaying text information corresponding to a heard voice uttered by the user. When the user has not uttered another voice (such as the multi-command word) after uttering the wakeup word, "Hi, I'm listening" is displayed in the voice prompt box 422. At the same time, the electronic device may further prompt the user to start inputting a voice instruction (the multi-command word) by broadcasting the prompt information "Hi, I'm listening" by voice.

Figure 5A:
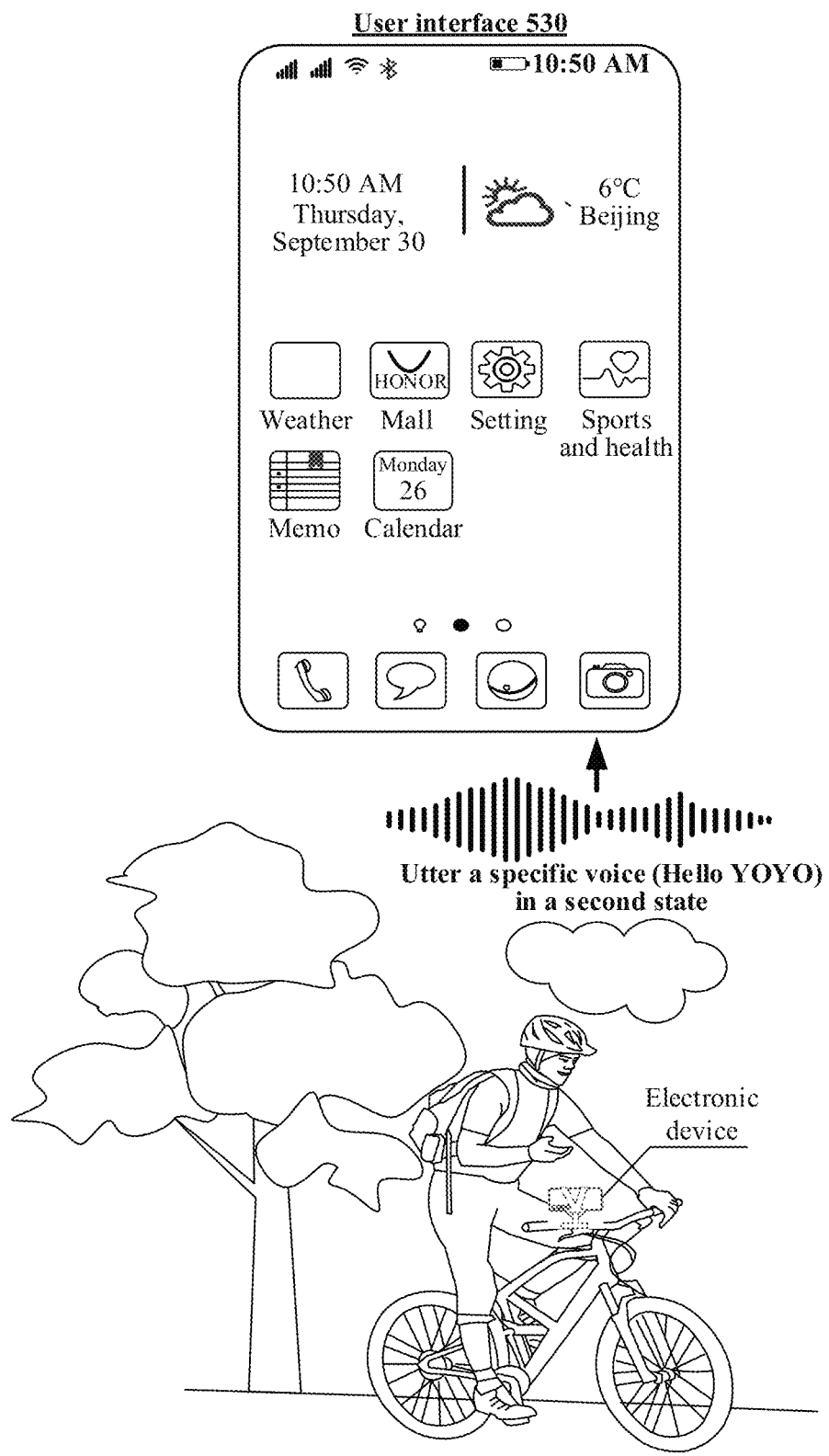
FIG. 5A to FIG. 5B are schematic diagrams of a group of user interfaces when the registered user performs the voice test in a second state according to an embodiment of this application.
Figure 5B:
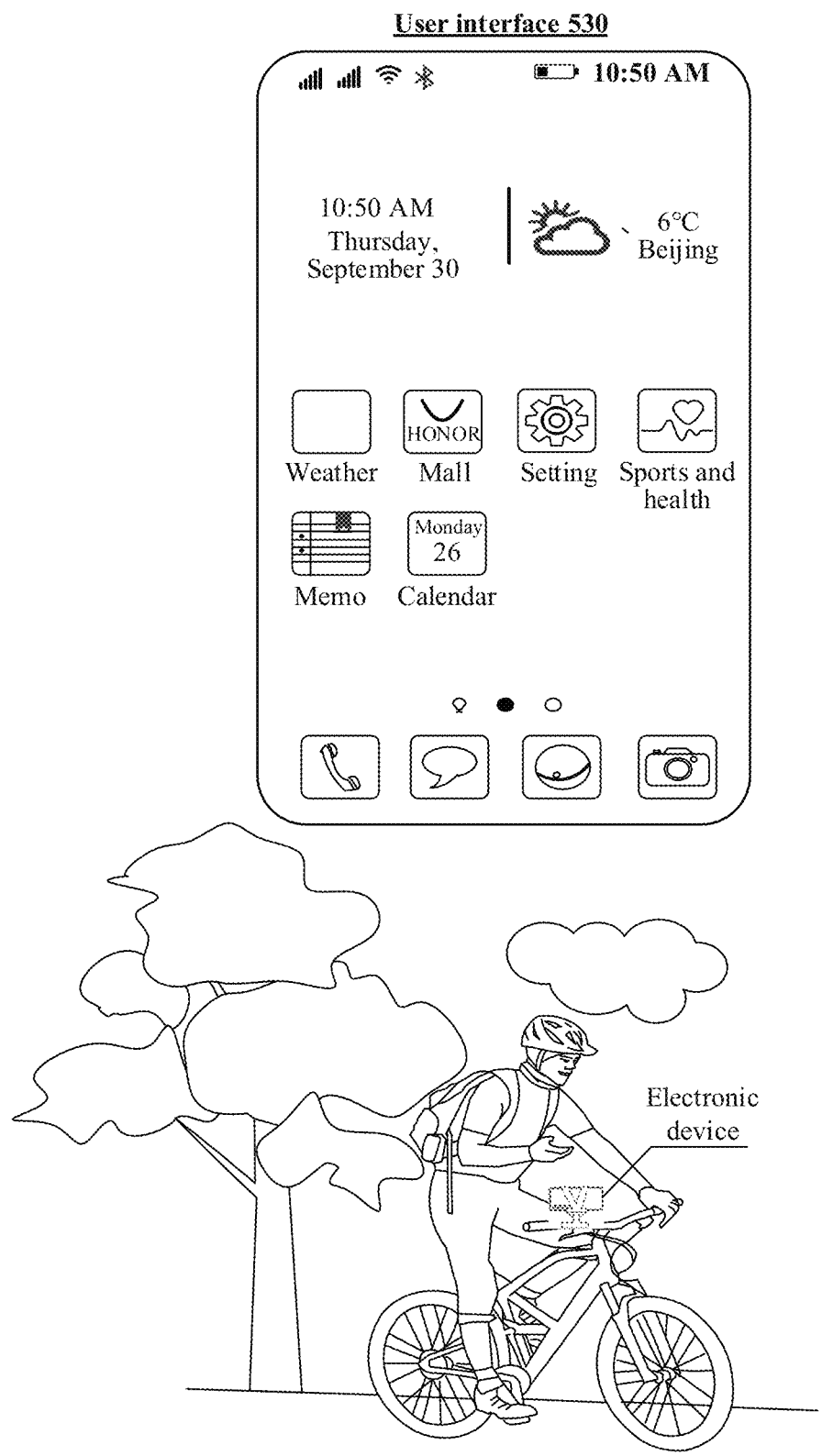

Referring to FIG. 5A to FIG. 5B, FIG. 5A to FIG. 5B exemplarily illustrate schematic diagrams of a group of user interfaces when the registered user performs the voice test in the second state.

Referring to FIG. 5A, FIG. 5A exemplarily illustrates a schematic diagram of an operation that the registered user outputs a wakeup word in the second state.

As shown in FIG. 5A, it is assumed that the registered user inputs a specific voice into the electronic device in the second state, and the second state means that any of the user's physiological, pathological, and psychological states is in an unhealthy, non-calm, and unstable state, including, but not limited to, a state when the user is doing a vigorous exercise (cycling), has a throat lesion, or is emotionally tense and unstable. Alternatively, the second state further includes a state in which the user's speech is affected by the environment. In this application, in FIG. 5A, the wakeup word outputted by the registered user in the second state is included in a first voice instruction outputted by the registered user in the second state. Both the first voice instruction and a second voice instruction described below are voice instructions uttered by a same user (such as the registered user) in a same state. Operations specifically corresponding to the first voice instruction and the second voice instruction may be any one of the following: waking up a voice assistant, controlling the voice assistant to perform a response operation, or logging in to an account of the user. The operations indicated by the first voice instruction and the second voice instruction may be the same or different.

Therefore, in the scenario shown in FIG. 5A, in response to the detected specific voice, the electronic device may not wake up the smart voice assistant "YOYO" of the electronic device and keep displaying a user interface the same as the user interface 530 shown in FIG. 5A. See FIG. 5B for details. This is because, when the electronic device collects, through the microphone, the specific voice outputted by the registered user in the second state and performs voiceprint recognition, a recognition result is inaccurate and the current speaker is misjudged as a non-registered person.

In another example of this application, when the electronic device performs voiceprint recognition, if the recognition fails, that is, if it is determined that the current speaker is not the registered user, the electronic device may not respond (for example, the voice recognition icon 421 and the voice prompt box 422 are not displayed), and the electronic device may further output prompt information indicating that voiceprint recognition fails, or prompt information indicating that voiceprint recognition is re-performed, or the like. In this application, when voiceprint recognition of the electronic device fails, the electronic device not responding, outputting the prompt information indicating that voiceprint recognition fails and outputting the prompt information indicating that voiceprint recognition is re-performed are collectively referred to as outputting a first result by the electronic device. The first result does not indicate that voiceprint recognition is successful.

To improve accuracy of voiceprint recognition, the voiceprint model in the electronic device needs to be updated. Specifically, the automatic update means that the electronic device may learn, in real time, a specific voice inputted by the user, and perform voiceprint model training based on a large amount of voice data and update the previous voiceprint model, so as to provide the user with a more accurate voiceprint recognition function and increase a wakeup success rate of the electronic device.

Figure 6:
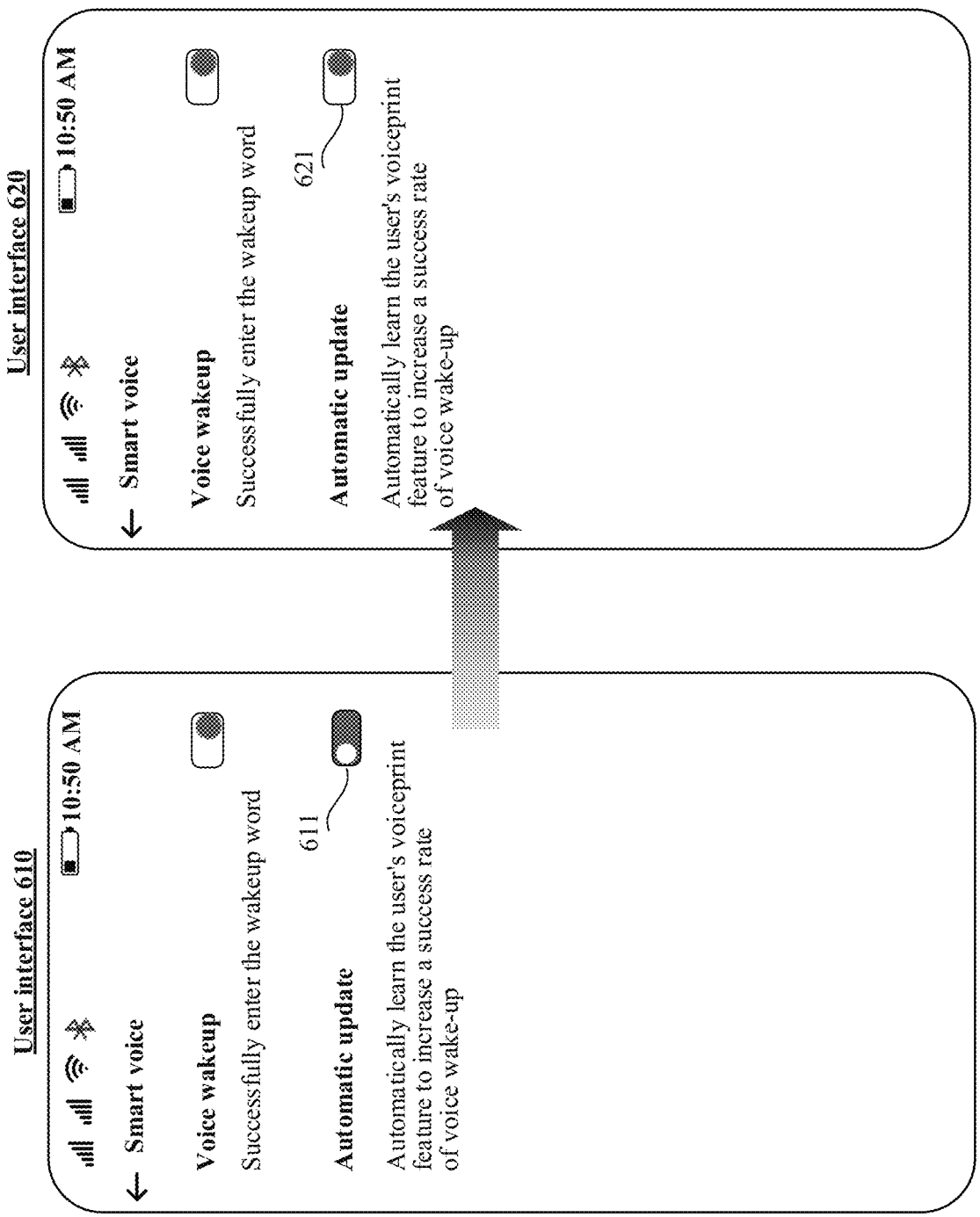
FIG. 6 is a schematic diagram of a user interface on which a function of automatically updating a voiceprint model is enabled according to an embodiment of this application.

Referring to FIG. 6, FIG. 6 exemplarily illustrates a schematic diagram of a user interface on which a function of automatically updating the voiceprint model is enabled.

As shown in FIG. 6, a user interface 610 is similar to the user interface 350 shown in FIG. 3E described above. The description of the user interface 610 may be specifically obtained with reference to the foregoing description of the user interface 350. When the electronic device detects a switch control corresponding to an automatic update function in the user interface 610, the electronic device enables the automatic update function. That is, the electronic device switches a state of the switch control from an off state 611 in the user interface 610 to an on state 621 in a user interface 620. Specific introduction to the automatic update function may also be obtained with reference to detailed introduction in the following method process.

It may be understood that the content shown in FIG. 6 is only an example and should not constitute a limitation on this application.

Figure 7A:
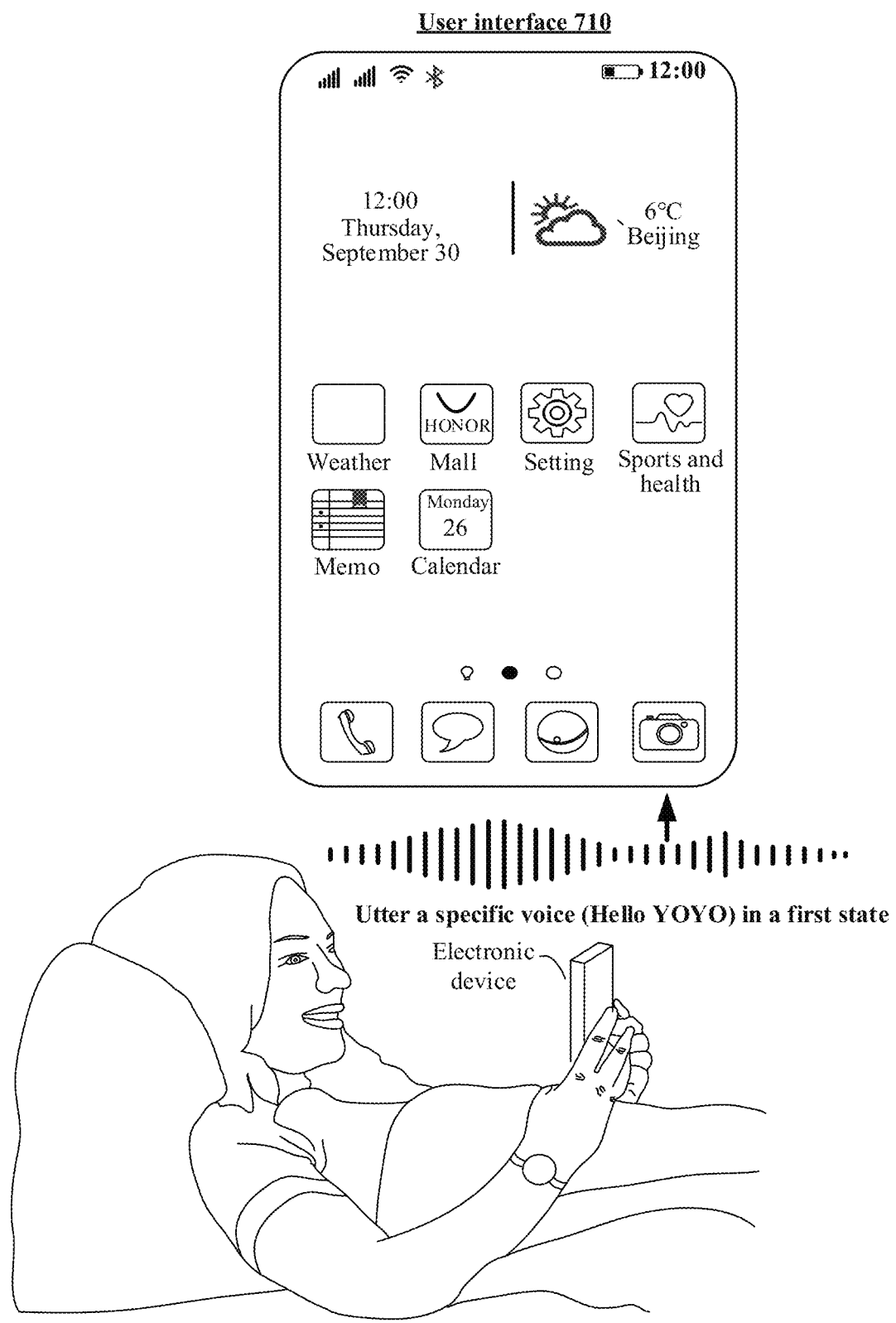
FIG. 7A to FIG. 7B are schematic diagrams of another group of user interfaces when the registered user performs the voice test in the first state according to an embodiment of this application.
Figure 7B:
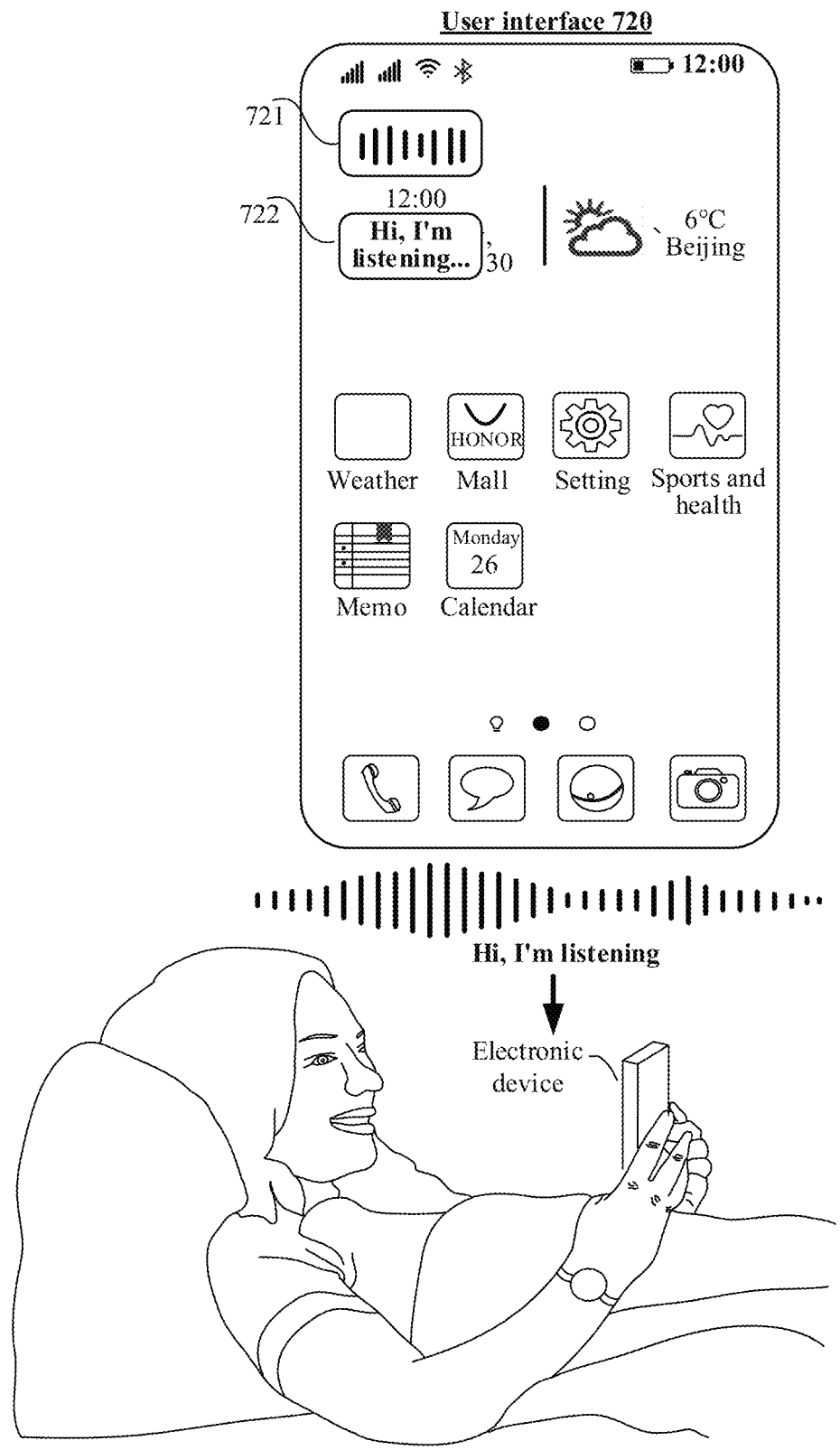

Referring to FIG. 7A to FIG. 7B, FIG. 7A to FIG. 7B exemplarily illustrate schematic diagrams of another group of user interfaces when the registered user performs the voice test in the first state.

Referring to FIG. 7A, FIG. 7A exemplarily illustrates a schematic diagram of an operation that the registered user outputs a wakeup word in the first state.

As shown in FIG. 7A, it is assumed that the registered user inputs a specific voice into the electronic device in the first state, and the first state means that the user's physiological, pathological, and psychological states are all in a healthy, calm, and stable state. The first state includes, but is not limited to, a state when the user is resting on a bed. Therefore, in this case, in response to the wakeup word inputted by the registered user, the electronic device may wake up the smart voice assistant "YOYO" of the electronic device in response to the detected specific voice, and switch an originally displayed user interface 710 shown in FIG. 7A to a displayed user interface 720 as shown in FIG. 7B.

Referring to FIG. 7B, FIG. 7B exemplarily illustrates a schematic diagram of a user interface displayed by the electronic device in response to the wakeup word inputted by the registered user.

As shown in FIG. 7B, the user interface 720 is a voice control interface, and a voice recognition icon 721 and a voice prompt box 722 are displayed on the interface. The voice recognition icon 721 is used for prompting the user that the electronic device has woken up the smart voice assistant, and the voice prompt box 722 is used for displaying text information corresponding to a heard voice uttered by the user. When the user has not uttered another voice (such as the multi-command word) after uttering the wakeup word, "Hi, I'm listening" is displayed in the voice prompt box 722. At the same time, the electronic device may further prompt the user to start inputting an operation instruction (the multi-command word) by broadcasting the prompt information "Hi, I'm listening" by voice.

Figure 8A:
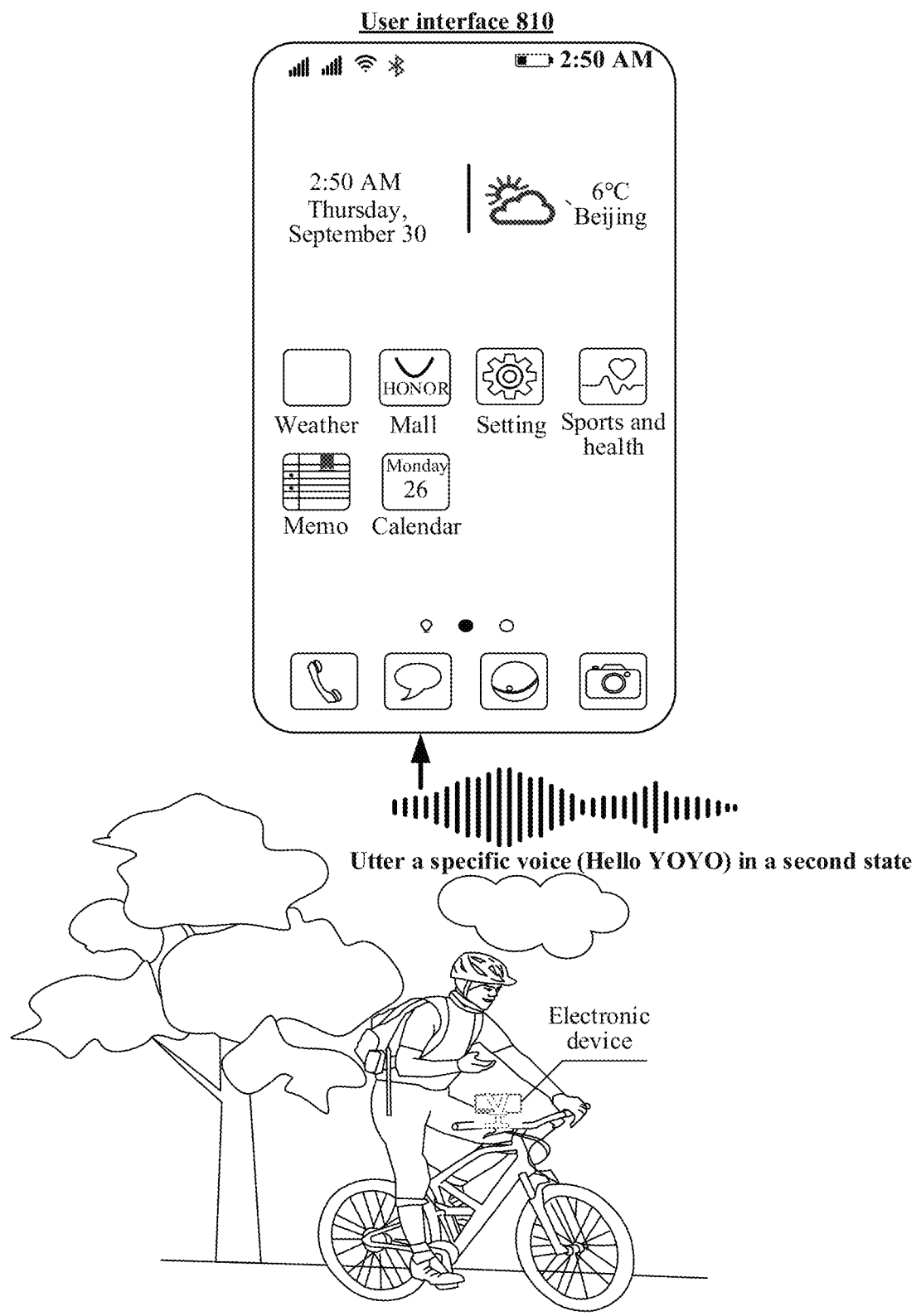
FIG. 8A to FIG. 8C are schematic diagrams of another group of user interfaces when the registered user performs the voice test in the second state according to an embodiment of this application.
Figure 8B:
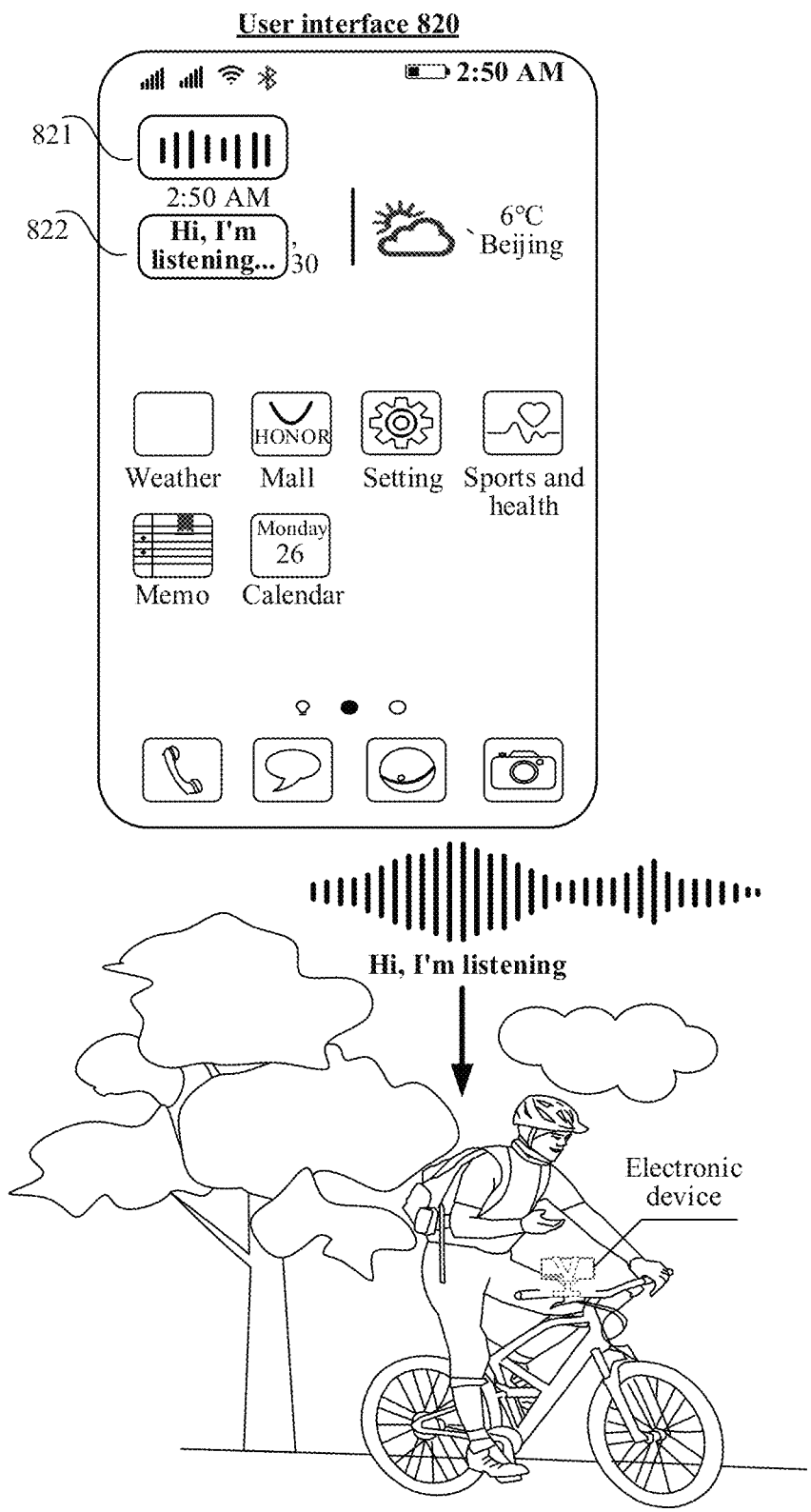

Referring to FIG. 8A to FIG. 8B, FIG. 8A to FIG. 8B exemplarily illustrate schematic diagrams of another group of user interfaces when the registered user performs the voice test in the second state.

Referring to FIG. 8A, FIG. 8A exemplarily illustrates a schematic diagram of an operation that the registered user outputs a wakeup word in the second state.

As shown in FIG. 8A, it is assumed that the registered user inputs a specific voice into the electronic device in the second state, and the second state means that any of the user's physiological, pathological, and psychological states is in an unhealthy, non-calm, and unstable state, including, but not limited to, a state when the user is doing a vigorous exercise (cycling), has a throat lesion, or is emotionally tense and unstable. Therefore, in the scenario shown in FIG. 8A, the electronic device may wake up the smart voice assistant "YOYO" of the electronic device in response to the detected specific voice, and switch an originally displayed user interface 810 shown in FIG. 8A to a displayed user interface 820 as shown in FIG. 8B. In this application, in FIG. 8A, the wakeup word outputted by the registered user in the second state is included in a second voice instruction outputted by the registered user in the second state.

Referring to FIG. 8B, FIG. 8B exemplarily illustrates a schematic diagram of a user interface displayed by the electronic device in response to the wakeup word inputted by the registered user.

As shown in FIG. 8B, the user interface 820 is a voice control interface, and a voice recognition icon 821 and a voice prompt box 822 are displayed on the interface. The voice recognition icon 821 is used for prompting the user that the electronic device has woken up the smart voice assistant, and the voice prompt box 822 is used for displaying text information corresponding to a heard voice uttered by the user. When the user has not uttered another voice (such as the multi-command word) after uttering the wakeup word, "Hi, I'm listening" is displayed in the voice prompt box 822. At the same time, the electronic device may further prompt the user to start inputting an operation instruction (the multi-command word) by broadcasting the prompt information "Hi, I'm listening" by voice.

Figure 8C:
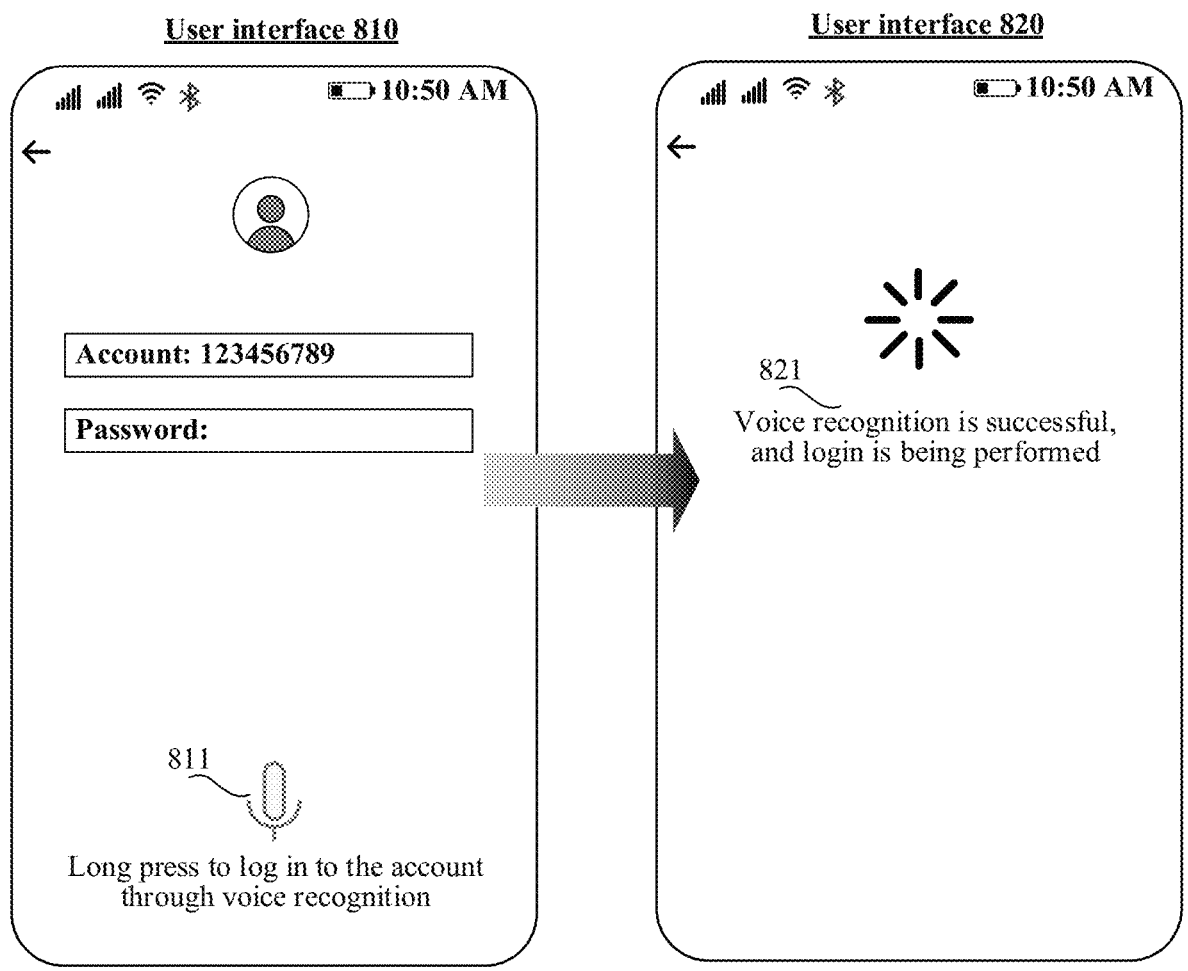

It may be understood that the voiceprint recognition method according to this application is not only applicable to the voice wakeup scenario described above, but also applicable to, for example, an account login scenario. Refer to FIG. 8C for details.

As shown in FIG. 8C, the electronic device is in an account login process, and the user may log in to an account through voiceprint recognition. Specifically, the user may input a voice by long pressing a control 811. The electronic device, after collecting the voice, uses the voiceprint recognition method according to this application, that is, uses the updated voiceprint model, to identify whether identity of the current user is a registered user corresponding to the account. If yes, the electronic device may successfully log in to the account or output prompt information indicating that voiceprint recognition is successful.

In this application, results outputted by the electronic device in FIG. 8B and FIG. 8C above may both be referred to as a second result. The second result is used for indicating that voiceprint recognition is successful.

Based on the above UI embodiments, accuracy of voiceprint recognition of the electronic device before and after the automatic update function is enabled is compared, from which it can be learned that the accuracy of voiceprint recognition of the electronic device after the automatic update function is enabled has been improved, specifically reflected in the fact that the registered user still can successfully wake up the voice assistant in the second state. This is because, after the electronic device enables the automatic update function, each time the electronic device detects that a speaker inputs a specific voice and determines that the speaker is the registered user, the electronic device can perform voice synthesis according to the specific voice inputted by the speaker to obtain a plurality of synthesized voices related to a voiceprint feature of the real specific voice. These synthesized voices simulate voices outputted by the registered user in different states. In other words, these synthesized voices have similar voiceprint features to the voices uttered by the registered user with different emotions, speech speeds, intonations, volumes, and the like. Then, the electronic device learns through such a large number of synthesized voices, so as to train an updated voiceprint model. The updated voiceprint model can extract, from the user voiceprint feature, representation information more comprehensively describing a voiceprint feature of the registered user than the previously preset voiceprint model. In other words, the registered user representation outputted by the updated voiceprint model more comprehensively simulates voiceprint features of voices outputted by the user in different states, so that a success rate of voiceprint recognition performed by the user in the second state is higher.

It may be understood that, after the automatic update function of the electronic device is enabled, the electronic device can perform real-time update without user perception based on the voice synthesized according to the specific voice of the registered user. For example, when synthesized voices stored in a corpus database reach a threshold, the electronic device may perform update according to the synthesized voices, or the electronic device may preset an update cycle, and update the voiceprint model once every week, every three days, or the like. The time of updating the voiceprint model by the electronic device may be specifically obtained with reference to the judgment on the model update condition described in the method process below. Details are not described herein.

Based on the above UI embodiments, the voiceprint recognition method according to this application is introduced in detail below with reference to the method process shown in FIG. 9.

Figure 9:
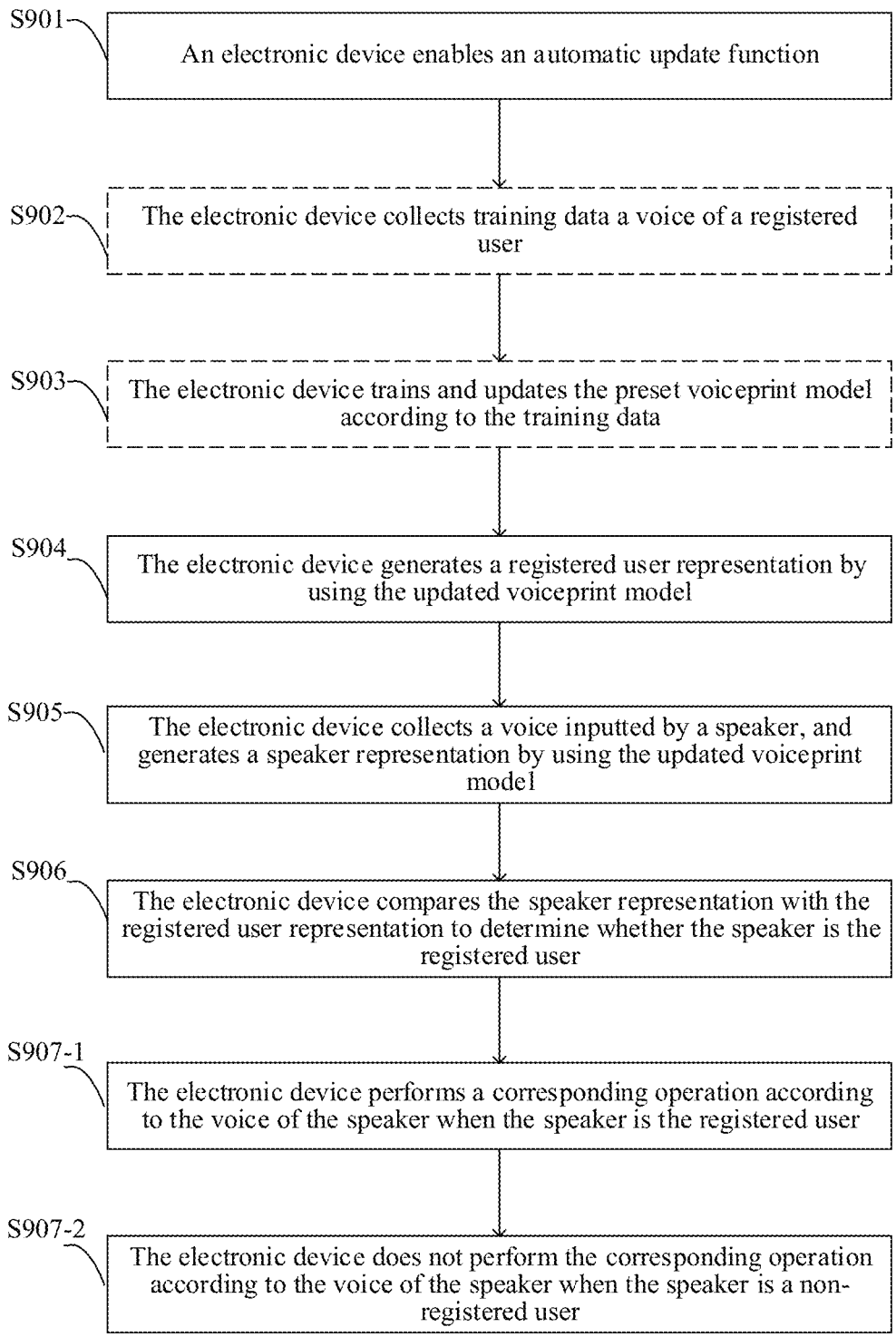
FIG. 9 is a flowchart of a voiceprint recognition method according to an embodiment of this application.

As shown in FIG. 9, the voiceprint recognition method includes the following steps:

S901: An electronic device enables an automatic update function.

The automatic update function means that the electronic device may learn and register, in real time, a voice inputted by the user, and perform voiceprint model training based on a large number of voices and update the previously preset voiceprint model, so as to provide the user with a more accurate voiceprint recognition function. After the automatic update function is enabled, the electronic device is triggered to perform operations corresponding to steps S902 to S907-1/S907-1.

In some embodiments, the electronic device may enable the automatic update function according to a user operation. The user operation may be obtained with reference to the manual operation method shown in FIG. 6 above, or the user operation may be a voice instruction, or the like. This is not limited in this application.

In some other embodiments, the electronic device may enable the automatic update function by default, and no user operation is required to trigger the electronic device to enable the automatic update function.

S902: The electronic device collects training data based on a voice of a registered user.

In this embodiment of this application, the training data may include: a voiceprint feature corresponding to the voice of the registered user, and/or a voiceprint feature corresponding to a synthesized voice obtained based on the voice of the registered user.

In this application, the training data includes the voiceprint feature corresponding to the voice of the registered user, and the voice of the registered user herein may also be called a third voice.

A method for acquiring the voice of the registered user includes any one or more of the following:

(1) The registered user inputs a registered voice during voiceprint registration. A process of performing voiceprint registration by the registered user may be obtained with reference to the description of steps S102 to S104 above. In this application, the registered voice inputted by the registered user in steps S102 to S104 above may also be called a fifth voice or an old registered voice.

(2) The registered user inputs a specific voice during daily use of the electronic device.

Specifically, the electronic device may extract a voiceprint feature from a collected specific voice inputted by a speaker, obtain a speaker representation based on the voiceprint feature by using a preset voiceprint model, and compare the speaker representation with the registered user representation obtained by the preset voiceprint model in step S104 above. If a similarity between the two is greater than the threshold (which may be called a second value), indicating that the voice currently inputted by the speaker is the voice of the registered user, the voice is stored in the electronic device and used as training data.

(3) The registered user inputs any voice during daily use of the electronic device.

Specifically, the electronic device, under authorization of the user, collects any voice uttered by the registered user within a scope of authorization of the user (such as within a fixed time period or use of a fixed APP).

(4) The electronic device may provide the user with an interactive window, and collect and store a plurality of voices outputted by the registered user in states of simulating different emotions and speech speeds.

The voiceprint feature corresponding to the voice of the registered user is used as the training data, so that a voiceprint model more in line with the user's speaking style and habits can be obtained according to the user's real voice, and the accuracy of voiceprint recognition can be improved.

A method for acquiring the synthesized voice obtained based on the voice of the registered user includes:
  acquiring, by the electronic device, the voice of the registered user, and then generating the synthesized voice based on the voice of the registered user. Specific implementation of acquiring the voice of the registered user may be obtained with reference to the above. Specific steps of generating the synthesized voice based on the voice of the registered user are as follows:

Specifically, the electronic device first acquires a synthesis parameter of the voice of the registered user, and then the synthesis parameter is inputted into the electronic device. The electronic device generates one or more synthesized voices corresponding to the voice of the registered user according to the synthesis parameter. Specifically, a voice synthesis model preset in the electronic device generates the one or more synthesized voices corresponding to the voice of the registered user according to the synthesis parameter.

In this embodiment of this application, the synthesis parameter of the voice of the registered user includes: a voiceprint feature, and a to-be-synthesized text. Both the voiceprint feature and the to-be-synthesized text are extracted from the voice of the registered user. Then, the preset voice synthesis model generates a corresponding synthesized voice based on the voiceprint feature and the to-be-synthesized text. A text of the synthesized voice is consistent with the to-be-synthesized text. A difference between a voiceprint feature of the synthesized voice and the voiceprint feature is less than a threshold (also called a third value).

Optionally, the synthesis parameter of the voice of the registered user may further include a voice control parameter. The voice control parameter includes, but is not limited to, a vector used for controlling an emotion and a speech speed carried in the voice. During each voice synthesis, different voice control parameters are inputted, and the to-be-synthesized text and the voiceprint feature can be combined to generate a synthesized voice with different emotions and speech speeds, and a similarity between a voiceprint feature of the synthesized voice and the voiceprint feature is greater than the threshold. The emotions may be classified into: happy, sad, fearful, angry, neutral (neither happy nor sad), and the like. The speech speeds may be classified into: rapid, fast, medium, slow; and the like.

Optionally, the synthesis parameter of the voice of the registered user may further include a quantity of synthesized voices to control the preset voice synthesis model to generate a corresponding quantity of synthesized voices according to a combination of the to-be-synthesized text and the voiceprint feature. If the synthesis parameter of the voice of the registered user does not include the voice control parameter, due to inherent properties of the preset voice synthesis model, the plurality of synthesized voices synthesized based on a same to-be-synthesized text and a same voiceprint feature still have certain differences. This is because the voice synthesis model can control generation of different synthesized voices through parameters other than the above voice control parameters, but a similarity between voiceprint features of each two synthesized voices may be greater than the threshold.

In some embodiments, the quantity of synthesized voices of the registered user may be a fixed value preset by the electronic device, for example, 20.

In some other embodiments, the quantity of synthesized voices of the registered user is acquired according to a similarity between a speaker representation of a speaker to which the voice of the registered user belongs and a registered user representation. When the similarity between the two is greater, the quantity of synthesized voices is less. When the similarity between the two is smaller and greater than the threshold, the quantity of synthesized voices is greater. A size of the similarity may be measured by a score. When the similarity is greater, the score is higher. When the similarity between the two is smaller, the score is lower. A correspondence between the score and the quantity of synthesized voices of the registered user may be, for example, as follows: when the score ranges from 50 to 60, the corresponding quantity of synthesized voices is 50; when the score ranges from 60 to 70, the corresponding quantity of synthesized voices is 40; when the score ranges from 70 to 80, the corresponding quantity of synthesized voices is 30; when the score ranges from 80 to 90, the corresponding quantity of synthesized voices is 20; and when the score ranges from 90 to 100, the corresponding quantity of synthesized voices is 10. A corresponding rule between the score of voiceprint recognition and the quantity of synthesized voices is not limited in the embodiments of this application. For example, in some other embodiments of this application, voice synthesis is not performed when the score is in a range greater than 95.

The voiceprint feature corresponding to the synthesized voice obtained based on the voice of the registered user is used as the training data, so that more training data can be obtained in a short time, which saves the time for training and updating the voiceprint model. Moreover, when the quantity of synthesized voices of the registered user is determined by using the above rule, if the similarity between a speaker representation corresponding to the voice of the registered user and the registered user representation is greater than the threshold and is large, which indicates that the voiceprint model in this case can accurately recognize the voice of the registered user, there is not much room for improvement of performance of the model updated by acquiring training data based on the voice of the registered user. Conversely, when the similarity between the speaker representation corresponding to the voice of the registered user and the registered user representation is greater than the second value but small, which indicates that, although the preset voiceprint model in this case can recognize the voice of the registered user, there is a lot of room for improvement of performance of the model updated by the preset voiceprint model in this case by acquiring training data based on the voice of the registered user if the speaker utters another voice slightly different from the voice of the registered user.

S903: The electronic device trains and updates the preset voiceprint model according to the training data.

The electronic device may select part or all of the voice and/or the synthesized voice of the registered user and extract a voiceprint feature therefrom by using, but not limited to, a de-finetune and de-incremental training method, or another algorithm to update the preset voiceprint feature. A principle of the de-finetune and de-incremental training method involves: keeping some parameters in the preset voiceprint model unchanged, taking other parameters as adjustment parameters, and then inputting the voiceprint feature extracted from the voice and/or the synthesized voice of the registered user as training data into the preset voiceprint model for training. A specific training and updating method is specifically as follows:

Step 1: Part or all of voiceprint features extracted from the training data are respectively inputted into the preset voiceprint model to obtain a plurality of speaker representations. Generally, the plurality of speaker representations cannot be classified into one category. This is because the voiceprint features of the training data are quite different, so differences between the speaker representations obtained by using the preset voiceprint model may be greater than the threshold, which cannot be classified into one category.

Step 2: Some parameters in the preset voiceprint model are modified. Voiceprint features of a plurality of voices of the user are continuously inputted into the modified voiceprint model to obtain a plurality of speaker representations outputted by the modified model. If the speaker representations can be classified into one category, it indicates that the modified voiceprint model is a finally trained voiceprint model. Otherwise, some parameters in the voiceprint model are continuously modified and the above step is repeated until a condition that the plurality of speaker representations can be classified into one category is obtained.

In some embodiments of this application, the electronic device, when training and updating the preset voiceprint model according to the training data, may specifically randomly select voices of the registered user to train the voiceprint model.

In some embodiments of this application, the electronic device, when training and updating the preset voiceprint model according to the training data, may specifically select voices of the registered user in different states according to a type ratio to train the voiceprint model.

Preferably, the electronic device may select part of the voice and/or the synthesized voice according to a voice type ratio. For example, after the electronic device acquires the voice and/or the synthesized voice of the registered user, a label may be added to each voice. The label is used for identifying a type of the voice. The type of the voice may be classified according to any one or more of information such as an emotion and a speech speed carried in the voice. For example, if the label is classified only by emotion, the label may include, but not limited to, happy, sad, fearful, angry, neutral (neither happy nor sad), and the like. The voice type ratio is: non-neutral:neutral=1:1.2. "Neutral" refers to a voice uttered by the user in a normal state that is not happy, not sad, not afraid, and not impetuous, while "non-neutral" includes happy, sad, fearful, angry, and the like. In another example, the voice type ratio may be: happy:sad:fearful: angry:neutral=2:1:1:1:3. The voice type ratio may alternatively be another value, which is not limited in the embodiments of this application. Generally, the electronic device may store a large amount of voice data, so that a quantity of the voice data can meet the above type ratio to meet a requirement. In this way, the problem of low accuracy of voiceprint recognition caused by voice emotion drift of the user can be further fundamentally solved, and performance of the voiceprint model can be improved.

Optionally, as a prerequisite for step S904, the electronic device may further determine whether the electronic device meets an update condition. The update condition includes, but is not limited to, the electronic device being in an idle state or a charging state, a battery level being greater than a threshold, the electronic device being within a preset update time range (the preset update time is, for example, every Monday), and the like.

Determining whether the electronic device is in the idle state may be specifically determined by time detection and voice detection. For example, when it is detected that time is within a range of 0:00 to 7:00 Beijing time and it is detected by a microphone that ambient noise is lower than a threshold and there is no user voice, it is considered that the user is in a sleep state and is less likely to use the electronic device. Therefore, it is confirmed that the electronic device is in the idle state in this case. A method for detecting whether the electronic device is in the idle state is not specifically limited in the embodiments of this application. For example, in some other embodiments of this application, the electronic device may alternatively determine whether the electronic device is in the idle state by intelligently learning the user's habit of using the electronic device. In this way, the electronic device can update the voiceprint model without perception. In other words, an influence on user experience due to occupation of a running process of the electronic device caused by update of the voiceprint model during the user's possible use of the electronic device can be prevented.

S904: The electronic device generates a registered user representation by using the updated voiceprint model.

In some embodiments, the electronic device may generate the registered user representation according to a user operation by using the updated voiceprint model. Specifically, after the electronic device replaces the preset voiceprint model with the updated voiceprint model, the electronic device may output prompt information to prompt the user that the voiceprint model has been updated and remind the user to re-perform voiceprint registration. The user may re-perform voiceprint registration according to the prompt information or re-perform voiceprint registration according to the operation method shown in FIG. 3A to FIG. 3E above, so that the electronic device generates the registered user representation by using the updated voiceprint model. A specific method for the electronic device to generate the registered user representation by using the updated voiceprint model may be obtained with reference to the description of steps S102 to S104 above. Details are not described herein. In this application, herein, when the registered user re-performs voiceprint registration, an inputted registered voice may also be called a fourth voice or a new registered voice.

In some other embodiments, the electronic device may automatically generate the registered user representation by using the updated voiceprint model. Specifically, the electronic device may first select one or more voices from a library of voices that the registered user has uttered as a new registered voiceprint, and extract a corresponding voiceprint feature to use the updated voiceprint model to generate the registered user representation.

In some other embodiments, the electronic device may generate the registered user representation by using the updated voiceprint model simultaneously according to a registered voiceprint of the registered user re-inputted by the user operation and the voices that the registered user has uttered. Specifically, the electronic device may extract a voiceprint feature from the registered voiceprints of the registered user, and use the updated voiceprint model to generate the corresponding registered user representation according to the voiceprint feature. The electronic device may also extract a voiceprint feature from the voices that the registered user has uttered, and use the updated voiceprint model to generate a corresponding second registered user representation according to the voiceprint feature. Finally, the electronic device fuses the registered user representation with the second registered user representation to obtain a final registered user representation, and stores the final registered user representation as a reference standard for subsequent voiceprint recognition.

It may be understood that steps S901 to S904 above only exemplify the process in which the electronic device generates a new voiceprint model belonging to a registered user. However, in some other embodiments of this application, when the electronic device pre-registers a plurality of users by using the preset voiceprint model (that is, when registered user representations corresponding to the plurality of registered users are stored), the electronic device may generate an updated voiceprint model belonging to each registered user. Specifically as follows:

Step 1: The electronic device may alternatively separately collect training data belonging to each registered user according to the voice of each registered user. A process of collecting the training data of each registered user may be obtained with reference to step S902.

Step 2: The electronic device uses the training data of each registered user to train and update a same preset voiceprint model to separately obtain an updated voiceprint model exclusive to each registered user. A process of acquiring the updated voiceprint model of each registered user may be obtained with reference to step S903.

Step 3: The electronic device stores a plurality of updated voiceprint models, and binds the plurality of updated voiceprint models to the corresponding registered users respectively. Finally, the electronic device may use the corresponding updated voiceprint model to generate a registered user representation corresponding to the registered user.

S905: The electronic device collects a voice inputted by a speaker, and generates a speaker representation by using the updated voiceprint model.

Specifically, in a scenario where the user uses the electronic device to wake up the device, log in to the account, or perform a corresponding operation according to a voice instruction, the electronic device may collect the voice inputted by the speaker through a microphone, and extract a voiceprint feature of the speaker therefrom, and then use the updated voiceprint model to generate the speaker representation according to the voiceprint feature of the speaker.

Optionally, before the electronic device extracts the voiceprint feature of the speaker from the voice of the speaker, the electronic device further needs to verify a text corresponding to the voice. The electronic device may extract the voiceprint feature to prepare for subsequent representation comparison (S907-1/S907-2) only when the text corresponding to the voice is a specific text. In this way, the subsequent representation comparison performed by the electronic device triggered by a voice uttered by the speaker at will can be prevented. The specific text includes, but is not limited to, a wakeup word, a word (also called a multi-command word) corresponding to the voice instruction, and the like. The specific text may also be as follows: When the electronic device performs account login, if voice login verification is used, a text corresponding to the voice inputted by the speaker is also included in the specific text. The specific text is not limited in this application.

S906: The electronic device compares the speaker representation with the registered user representation to determine whether the speaker is the registered user.

Specifically, the electronic device compares the speaker representation with the registered user representation. When a similarity between the two is less than a threshold, it is determined that the speaker is a non-registered user, and the electronic device makes no response. When the similarity between the two is greater than the threshold, it is determined that the speaker is the registered user. If a plurality of registered user representations are stored in the electronic device, there is a need to compare the speaker representations with each registered user representation one by one to determine whether the speaker is a registered user and if yes, is specifically which registered user. The similarity may alternatively be measured by a score. For example, the greater the similarity, the higher the score. Otherwise, the score is lower.

S907-1: The electronic device performs a corresponding operation according to the voice of the speaker when the speaker is the registered user.

Specifically, if it is determined in step S907 that the speaker is a registered user, the electronic device may perform semantic analysis on the voice of the speaker and perform a corresponding operation according to an analysis result. For example, when the voice uttered by the speaker is a wakeup word, the electronic device may wake up the device and make a response as shown in FIG. 8A and FIG. 8B. In another example, when the voice uttered by the speaker is a verification word for account login, the electronic device may log in to the account and make a response as shown in FIG. 8A and FIG. 8B.

When the electronic device stores registered user representations corresponding to a plurality of registered users and the electronic device determines in S907-1 that a current registered user is one of the plurality of registered users stored, the electronic device may provide a personalized service for the registered user according to personal habits of the registered user. For example, after the registered user wakes up the device, the electronic device pushes news that the registered user often watches or opens a frequently used APP, or the like.

S907-2: The electronic device does not perform the corresponding operation according to the voice of the speaker when the speaker is a non-registered user.

In some embodiments of this application, the electronic device does not perform the operation corresponding to the speaker and makes no response when the speaker is the non-registered user.

In some embodiments of this application, the electronic device does not perform the operation corresponding to the speaker but may output, for example, prompt information indicating that voiceprint recognition fails and please re-input the voice when the speaker is the non-registered user.

Then, the electronic device may further repeat steps S902 to S907-1/S907-1 above until the electronic device disables the above automatic update function.

It can be found by comparing FIG. 8A to FIG. 8B with FIG. 5A to FIG. 5B that the accuracy of voiceprint recognition of the electronic device is improved when the updated voiceprint model is used. This is because the electronic device uses the updated model to generate the registered user representation and the speaker representation, while the updated voiceprint model uses a plurality of different types of voices of the registered user as data to support training and updating of the voiceprint model. Therefore, the updated voiceprint model obtained is an exclusive model of the registered user, which can generate, according to the voiceprint feature of the registered user, a more comprehensive registered user representation for identifying identity of the user. Then, when the registered user utters a specific voice in different states (including, but not limited to, the first state and the second state described above), the electronic device can accurately identify the speaker as the registered user and make a corresponding response.

Based on the above, after the electronic device adopts the voiceprint recognition method according to the embodiments of this application, the device can use the voice of the registered user and the synthesized voice generated according to the voice of the registered user as training data to update the preset voiceprint model to train an exclusive voiceprint model for the registered user, thereby improving a success rate of voiceprint recognition. Moreover, during the user's voiceprint recognition, the electronic device continuously collects voices of the registered user and updates the voiceprint model in real time, including update of the preset voiceprint model and re-update of the previously updated voiceprint model. In this way, the problem of low accuracy of voiceprint recognition due to a change in a user voiceprint feature of the registered user at different times, such as before and after a voice change period, and in different physiological and pathological states such as before and after throat inflammation can be prevented. Therefore, performance of the voiceprint model is improved, and the problem of low accuracy of voiceprint recognition caused by voiceprint drift and voice emotion drift of the user can be fundamentally solved.

An apparatus embodiment is introduced below based on the above method embodiments according to this application. Hardware and software architectures of the electronic device applied to the voiceprint recognition method according to this application are as follows:

The electronic device according to this embodiment of this application may be a terminal device equipped with iOS®, Android®, Harmony OS®, Microsoft® or another operating system, such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (AR), a virtual reality (VR) device, an artificial intelligence (artificial intelligence, AI) device, a wearable device, an in-vehicle device, a smart home device, and/or a smart city device. A specific type of the electronic device is not particularly limited in the embodiments of this application.

Figure 10:
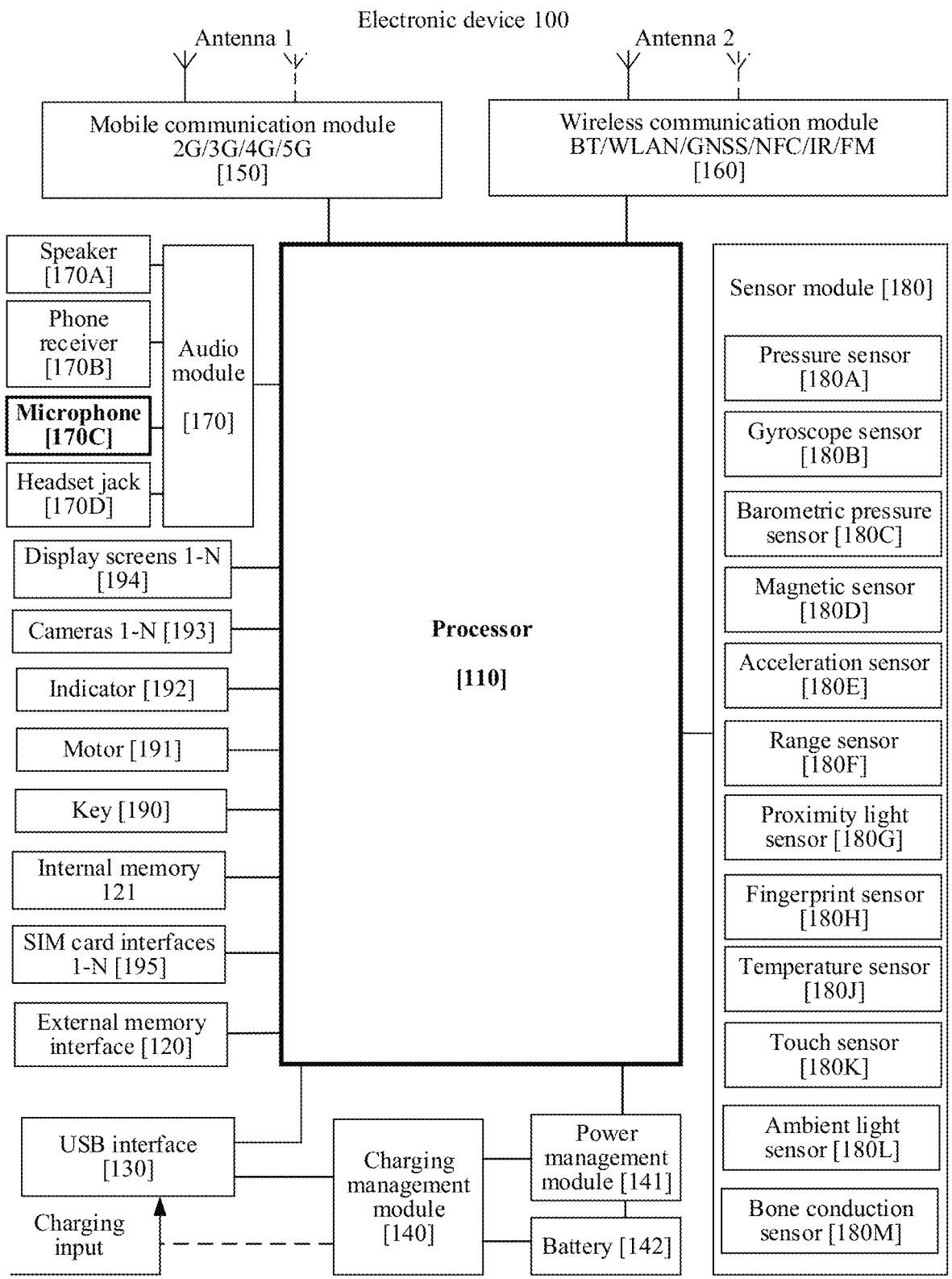
FIG. 10 is a schematic diagram of a hardware architecture of an electronic device according to an embodiment of this application.

FIG. 10 is a schematic structural diagram of an electronic device 100.

The electronic device 100 may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may be a nerve center and a command center of the electronic device 100. The controller may generate an operation control signal according to instruction operation code and a timing signal, to complete control of instruction reading and instruction execution.

A memory may also be disposed in the processor 110, configured to store instructions and data. In some embodiments, the memory in the processor 110 is a cache. The memory may store instructions or data just used or cyclically used by the processor 110. If the processor 110 needs to use the instructions or the data again, the processor may directly call the instructions or the data from the memory, to prevent repeated access and reduce waiting time of the processor 110, thereby improving system efficiency.

In this embodiment of this application, the processor 110 may be configured to perform voiceprint recognition, specifically configured to receive a voice outputted by a speaker collected by a microphone, verify a specific voice based on the voice, extract a corresponding voiceprint feature, and use a preset voiceprint model to generate a corresponding speaker representation which is compared with a registered user representation, thereby determining whether the speaker is a registered user. The specific step performed by the processor 110 may be obtained with reference to the foregoing description of steps S102 to S106. Details are not described herein.

In addition, the processor 110 may also be configured to perform voice synthesis to provide data support for update of the voiceprint model. The specific step performed by the processor 110 may be obtained with reference to the foregoing description of step S902. Details are not described herein.

In addition, the processor 110 may also be configured to use a voiceprint feature extracted from a real voice and/or a synthesized voice of the registered user as training data for model update, and detect whether a current device state meets an update condition. If the update condition is met, the processor 110 may train and update the latest voiceprint model (including the preset voiceprint model and the last updated voiceprint model) according to the training data. The specific step performed by the processor 110 may be obtained with reference to the foregoing description of steps S903 to S904. Details are not described herein.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in the embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input by using a wireless charging coil of the electronic device 100. The charging management module 140, while charging the battery 142, may also supply power to the electronic device through a power management module 141.

In this embodiment of this application, the processor 110 may further determine, through the charging management module 140, whether the electronic device is in a charging state, and determine, according to the state, whether the electronic device meets the update condition.

The power management module 141 is configured to be connected to the battery 142, the charging management module 140, and the processor 110. The power management module 141 receives input from the battery 142 and/or the charging management module 140, and supplies power to the processor 110, the internal memory 121, the external memory, the display screen 194, the camera 193, the wireless communication module 160, and the like. The power management module 141 may also be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve utilization of the antennas. For example, the antenna 1 may be multiplexed as a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave for radiation by using the antenna 1. In some embodiments, at least some function modules of the mobile communication module 150 may be disposed in the processor 110. In some embodiments, at least some of the functional modules of the mobile communication module 150 may be disposed in a same device as at least some of modules of the processor 110.

The modem processor may include a modulator and a demodulator. The modulator is configured to modulate a to-be-sent low-frequency baseband signal into an intermediate-/high-frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to an application processor. The application processor outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and is disposed in a same device as the mobile communication module 150 or another function module.

The wireless communication module 160 may provide a solution to wireless communication applied to the electronic device 100, such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components into which at least one communication processing module is integrated. The wireless communication module 160 receives an electromagnetic wave by using the antenna 2, performs modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert the to-be-sent signal into an electromagnetic wave for radiation by using the antenna 2.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display screen 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute a program instruction to generate or change display information.

The display 194 is configured to display an image, a video, and the like. The display 194 includes a display panel. A liquid crystal display (liquid crystal display, LCD) may be used as the display panel. The display panel may alternatively be manufactured by using an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include 1 or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may also optimize noise point, brightness, and skin tone algorithms. The ISP may also optimize parameters such as exposure and color temperature of a photographed scene. In some embodiments, the ISP may be disposed in the camera 193.

The camera 193 is configured to capture a still image or video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in standard RGB and YUV formats. In some embodiments, the electronic device 100 may include 1 or N cameras 193, where N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, voiceprint recognition, text understanding, and the like.

The internal memory 121 may include one or more random access memories (random access memory, RAM) and one or more non-volatile memories (non-volatile memory, NVM).

The random access memories may include a static-random access memory (static random-access memory, SRAM), a dynamic random access memory (dynamic random access memory, DRAM), a synchronous dynamic random access memory (synchronous dynamic random access memory, SDRAM), double data rate synchronous dynamic random access memory (double data rate synchronous dynamic random access memory, DDR SDRAM; for example, a fifth generation DDR SDRAM is generally referred to as DDR5 SDRAM), and the like.

The non-volatile memories may include a magnetic disk storage device and a flash memory.

The flash memory may be divided into NOR FLASH, NAND FLASH, 3D NAND FLASH, and the like according to an operation principle, or may be divided into a single-level cell (single-level cell, SLC), a multi-level cell (multi-level cell, MLC), a triple-level cell (triple-level cell, TLC), a quad-level cell (quad-level cell, QLC), and the like according to an electrical potential level of a storage unit, or may be divided into a universal flash storage (universal flash storage, UFS), an embedded multi-media card, (embedded multi media card, eMMC), and the like according to a storage specification.

The random access memories may be directly read and written by the processor 110, may be configured to store executable programs (for example, machine instructions) of an operating system or other running programs, or may be configured to store data of users and applications.

The non-volatile memories may also store the executable programs, the data of the users and the applications, and the like, and may be loaded into the random access memory in advance for the processor 110 to perform direct reading and writing.

In this embodiment of this application, the above non-volatile memories may be configured to store a preset voiceprint model and a preset voice synthesis model. Registered user related data and registered user voice related data include, but are not limited to, a registered user representation, a voice inputted by the registered user, a synthesized voice corresponding to the voice, and the like.

The external memory interface 120 may be configured to connect to an external non-volatile memory, to expand a storage capability of the electronic device 100. The external non-volatile memory communicates with the processor 110 by using the external memory interface 120, to implement a data storage function, for example, storing a file such as a music or a video in the external non-volatile memory.

The electronic device 100 may implement an audio function such as music playing or recording by using the audio module 170, the speaker 170A, the phone receiver 170B, the microphone 170C, the headset jack 170D, the AP, and the like.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some function modules in the audio module 170 are disposed in the processor 110.

The speaker 170A, also referred to as "horn", is configured to convert an electrical audio signal into a sound signal. Music may be listened to or a hands-free call may be answered by using the speaker 170A in the electronic device 100.

The phone receiver 170B, also referred to as "handset", is configured to convert an electrical audio signal into a sound signal. When the electronic device 100 is configured to answer a call or receive voice information, the phone receiver 170B may be put close to a human ear to receive a voice.

The microphone 170C, also referred to as "voice tube" or "mike", is configured to convert a sound signal into an electrical signal. When making a call or sending voice information, a user may make a sound approaching the microphone 170C through the mouth of the user, to input a sound signal into the microphone 170C. At least one microphone 170C may be disposed in the electronic device 100. In some other embodiments, two microphones 170C may be disposed in the electronic device 100, to acquire a sound signal and implement a noise reduction function. In some other embodiments, three, four, or more microphones 170C may be alternatively disposed in the electronic device 100, to acquire a sound signal, implement noise reduction, recognize a sound source, implement a directional recording function, and the like.

In this embodiment of this application, the microphone 170C may be configured to collect voice data of the speaker and surrounding environmental sounds, and transmit the voice data to the processor 110 for subsequent voiceprint recognition and model update according to the voice data.

The headset jack 170D is configured to be connected to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The key 190 includes a power key, a volume key, and the like. The key 190 may be a mechanical key, or a touch-type key. The electronic device 100 may receive a key input, and generate a key signal input related to user setting and function control of the electronic device 100.

The motor 191 may generate a vibration prompt. The motor 191 may be configured for an incoming call vibration prompt and a touch vibration feedback. For example, touch operations performed on different applications (such as photo taking and audio playing) may correspond to different vibration feedback effects. The motor 191 may also correspond to different vibration feedback effects for touch operations applied to different areas of the display screen 194. Different application scenarios (such as a time reminder, information receiving, an alarm clock, and a game) may also correspond to different vibration feedback effects. Customization of a touch vibration feedback effect may also be supported.

The indicator 192 may be an indicator light that may be configured to indicate a charging state and a power change, or may be configured to indicate a message, a missed call, a notification, and the like.

The SIM card interface 195 is configured to connect a SIM card. The SIM card may be inserted into the SIM card interface 195 or plugged from the SIM card interface 195, to come into contact with or be separated from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may also be compatible with an external memory card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event-driven architecture, a micro core architecture, a micro service architecture, or a cloud architecture. In this embodiment of this application, the software structure of the electronic device 100 is illustrated by using an Android system with a layered architecture as an example.

Figure 11:
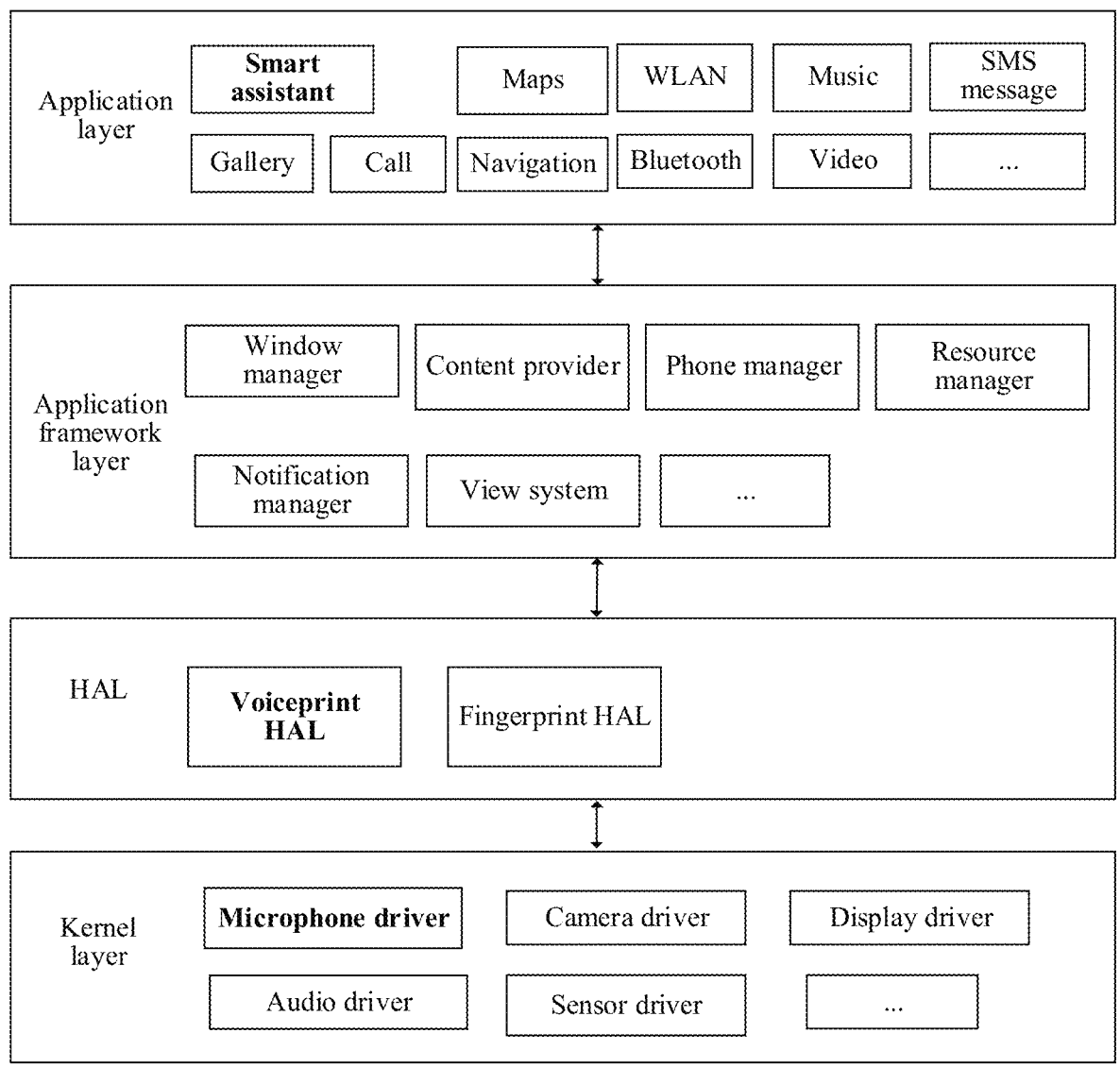
FIG. 11 is a schematic diagram of a software architecture of the electronic device according to an embodiment of this application.

FIG. 11 is a block diagram of the software structure of the electronic device 100 in this embodiment of this application.

In the layered architecture, software is divided into several layers, and each layer has a clear role and task. The layers communicate with each other through a software interface. In some embodiments, the Android system is divided into four layers, which are an application layer, an application framework layer, an Android runtime (Android runtime) and system library, and a kernel layer from top to bottom.

The application layer may include a series of application packages.

As shown in FIG. 11, the application packages may include applications such as smart assistant, gallery, call, maps, navigation, WLAN, Bluetooth, music, videos, and SMS messages. The smart assistant is only an optional name of an application for providing a voiceprint recognition function. In some other embodiments of this application, the application for providing the voiceprint recognition method in this application may also be called another name in addition to the smart assistant, such as a voice assistant, a smart voice, voiceprint recognition, or voiceprint recognition, which is not limited in this application.

In this embodiment of this application, the preset voiceprint model, the updated voiceprint model, and the preset voice synthesis model may be stored in the smart assistant of the application layer.

The application framework layer provides an application programming interface (application programming interface, API) and a programming framework for applications at the application layer. The application framework layer includes some predefined functions.

As shown in FIG. 11, the application framework layer may include a window manager, a notification manager, a content provider, a view system, a phone manager, a resource manager, and the like.

The window manager is configured to manage a window application. The window manager may acquire a size of a display screen, determine whether there is a status bar, perform screen locking, take a screenshot of the screen, and the like.

The content provider is configured to store and obtain data and make the data accessible to an application. The data may include video, an image, audio, calls that are made and answered, a browsing history and a bookmark, a phonebook, and the like.

The view system includes visual controls such as a control for displaying a text and a control for display a picture. The view system may be configured to construct an application program. A display interface may include one or more views. For example, a display interface including an SMS notification icon may include a view for displaying a text and a view for displaying a picture.

The phone manager is configured to provide a communication function for the electronic device 100, for example, call status management (including connected, hang-up, and the like).

The resource manager provides various resources such as a localized character string, an icon, an image, a layout file, and a video file for an application.

The notification manager enables an application to display notification information in the status bar that may be used to convey a message of a notification type, where the message may disappear automatically after a short stay without user interaction. For example, the notification manager is configured to provide a notification of download completion, a message reminder, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flash.

A hardware abstraction layer (Hardware Abstraction Layer, HAL) is located between the kernel layer and the framework layer, and plays a connecting role. Specifically, the HAL defines a set of standard interfaces, including: a voiceprint HAL, a fingerprint HAL, another Sensor HAL, and the like.

The kernel layer is a layer between hardware and software. The kernel layer includes at least a microphone driver, a display driver, a camera driver, an audio driver, and a sensor driver.

In this embodiment of this application, a smart assistant application may send a voice detection command to the microphone driver through the interface provided by the application framework layer and the voiceprint HAL, so that the microphone driver can control the microphone to detect a voice inputted by the speaker. The smart assistant application may further receive a voice inputted by the speaker collected by the microphone through the interface in the application framework layer, the voiceprint HAL, and the microphone driver, and perform voiceprint recognition according to the voice to determine whether the speaker is a registered user. The smart assistant application performs a corresponding operation according to a voiceprint recognition result. For example, when the voiceprint recognition result is that a current speaker is a non-registered user, no response is made. When the voiceprint recognition result is that the current speaker is a registered user, the smart assistant application may display the voice recognition icon 421, the voice prompt box 422, and the like as shown in FIG. 4B below, and may also broadcast the prompt information "Hi, I'm listening" by voice.

The following illustrates working processes of software and hardware of the electronic device with reference to a voice wakeup scenario.

When the microphone 170C receives a voice input operation, a corresponding hardware interrupt is sent to the microphone driver in the kernel layer. The microphone driver in the kernel layer processes the touch operation into an original input event (including information such as a voice input event). The original input event is stored at the kernel layer. The application framework layer acquires the original input event from the kernel layer, and recognizes a voice instruction corresponding to the input event. The voice instruction is an operation of waking up the smart assistant of the electronic device. The smart assistant application calls the interface of the application framework layer and enables the voiceprint service to provide a service for the smart assistant application.

It should be understood that the steps of the foregoing method embodiments according to this application may be implemented by using a hardware integrated logic circuit in the processor or implemented by using an instruction in a software form. The steps of the methods disclosed with reference to the embodiments of this application may be directly implemented by a hardware processor, or may be implemented by a combination of hardware and software modules in a processor.

This application further provides an electronic device. The electronic device may include: a memory and a processor. The memory may be configured to store a computer program. The processor may be configured to call the computer program in the memory to cause the electronic device to perform the method in any one of the foregoing embodiments.

This application further provides a chip system. The chip system includes at least one processor configured to implement the functions involved in the method performed by the electronic device in any one of the foregoing embodiments.

In a possible design, the chip system further includes a memory. The memory is configured to store a program instruction and data. The memory is located inside the processor or outside the processor.

The chip system may include a chip, or may include a chip and another discrete device.

Optionally, the chip system may include one or more processors. The processor may be implemented by using hardware or by using software. When implemented by using hardware, the processor may be a logic circuit, an integrated circuit, or the like. When implemented by software, the processor may be a general-purpose processor and be implemented by reading software code stored in the memory.

Optionally, the chip system may also include one or more memories. The memory may be integrated with the processor, or may be separated from the processor, which is not limited in the embodiments of this application. Exemplarily, the memory may be a non-transitory memory such as a read only memory (ROM), and the memory and the processor may be integrated on a same chip, or may be arranged on different chips respectively. A type of the memory and an arrangement manner of the memory and the processor are not limited in the embodiments of this application.

Exemplarily, the chip system may be a field programmable gate array (field programmable gate array, FPGA), an application specific integrated circuit (application specific integrated circuit, ASIC), a system on chip (system on chip, SoC), a central processor unit (central processor unit, CPU), a network processor (network processor, NP), a digital signal processor (digital signal processor, DSP), a micro controller unit (micro controller unit, MCU), a programmable logic device (programmable logic device, PLD), or another integrated chip.

This application further provides a computer program product. The computer program product includes: a computer program (also referred to as code or an instruction). When run, the computer program causes a computer to perform the method performed by the electronic device in any one of the foregoing embodiments.

This application further provides a computer-readable storage medium. The computer-readable storage medium stores a computer program (also referred to as code or an instruction). When run, the computer program causes a computer to perform the method performed by the electronic device in any one of the foregoing embodiments.

Various implementations of this application may be arbitrarily combined to achieve different technical effects.

All or some of the foregoing embodiments may be implemented by using software, hardware, firmware, or any combination thereof. When the software is used for implementation, implementation may be entirely or partially performed in the form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device such as a server or a data center in which one or more usable mediums are integrated. The usable medium may be a magnetic medium (for example, a floppy disk, a hard disk, or a magnetic tape), an optical medium (for example, a DVD), a semiconductor medium (for example, a solid-state drive Solid State Disk), or the like.

A person of ordinary skill in the art may understand that all or some of the procedures in the methods in the above embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a RAM, a magnetic disk, or an optical disc.

In conclusion, the descriptions above are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A voiceprint recognition method, comprising:
   detecting, by an electronic device, a first voice instruction, and outputting a first result, wherein the first result does not indicate that voiceprint recognition is successful; and
   detecting, by the electronic device, a second voice instruction, and outputting a second result, the second result indicating that voiceprint recognition is successful;
   the first voice instruction and the second voice instruction both comprising a voiceprint feature of a user in a same state;
   before the detecting, by the electronic device, a second voice instruction, the method further comprises:
   acquiring, by the electronic device, one or more third voices of the user, wherein the electronic device comprises a first voiceprint model;
   determining that the electronic device is in one or more of the following states: an idle state, a charging state, within a preset update time range, or a battery level being greater than a threshold;
   training the first voiceprint model based on the one or more third voices to obtain a second voiceprint model, wherein the training the first voiceprint model based on the one or more third voices to obtain the second voiceprint model comprises:
   acquiring a text corresponding to the one or more third voices, and a third voiceprint feature;
   generating one or more synthesized voices according to the text and the third voiceprint feature, a text corresponding to the one or more synthesized voices being the same as the text corresponding to the one or more third voices, a similarity between a voiceprint feature of the one or more synthesized voices and the third voiceprint feature being greater than a third value; and
   training the first voiceprint model by using a training voice, to obtain the second voiceprint model, wherein the training voice comprises at least part of the one or more third voices or at least part of the one or more synthesized voices; and
   generating, by the electronic device, a first user representation according to a fourth voice of the user by using the second voiceprint model, wherein the first user representation indicates a voiceprint feature of the user, wherein the second voiceprint model and the first user representation are used by the electronic device to perform voiceprint recognition on the second voice instruction.

2. The method according to claim 1, wherein after the detecting, by the electronic device, the second voice instruction, the method further comprises:
   recognizing, by the electronic device, a voice corresponding to the second voice instruction, and performing an operation corresponding to the voice, wherein
   the operation comprise at least one of the following: waking up a voice assistant, controlling the voice assistant to perform a corresponding operation, or logging in to an account of the user.

3. The method according to claim 2, wherein before the training the first voiceprint model based on the one or more third voices, the method further comprises:
   generating, by the electronic device, a second user representation according to a fifth voice of the user by using the first voiceprint model, wherein the second user representation indicates a voiceprint feature of the user, the second user representation being different from the first user representation; and
   the acquiring, by the electronic device, one or more third voices of the user comprises:
   detecting, by the electronic device, a sixth voice;
   acquiring, by the electronic device, a second voiceprint feature from the sixth voice, and obtaining a second speaker representation according to the second voiceprint feature by using the first voiceprint model; and
   determining the corresponding sixth voice when a second similarity between the second speaker representation and the second user representation is greater than a second value as the one or more third voices of the first user;
   wherein the fourth voice comprises one or more of the following voices: the third voice, the fifth voice, and a voice that the electronic device prompts the user to actively register.

4. The method according to claim 1, wherein before the training the first voiceprint model based on the one or more third voices, the method further comprises:
   enabling, by the electronic device, a function for updating the first voiceprint model.

5. The method according to claim 1, wherein after the detecting, by the electronic device, the second voice instruction and before the outputting the second result indicating that voiceprint recognition is successful, the method further comprises:
   acquiring, by the electronic device, a first voiceprint feature from the second voice instruction, obtaining a first speaker representation according to the first voiceprint feature by using the second voiceprint model, and determining that voiceprint recognition is successful in response to determining that a first similarity between the first speaker representation and the first user representation is greater than a first value.

6. The method according to claim 1, wherein the generating one or more synthesized voices according to the text and the third voiceprint feature comprises:
   generating, by the electronic device, the one or more synthesized voices according to a voice control parameter, the text, and the third voiceprint feature, wherein the voice control parameter comprises at least one of an emotion parameter or a speech speed parameter, an emotion of the one or more synthesized voices is the same as an emotion indicated by the emotion parameter, a text corresponding to one or more synthesized voices is the same as the text corresponding to the one or more third voices, and a similarity between the voiceprint feature of the one or more synthesized voices and the third voiceprint feature is greater than a third value.

7. The method according to claim 6, wherein the training the first voiceprint model by using the training voice comprises:
   selecting, by the electronic device, the at least part of the one or more third voices or the at least part of the one or more synthesized voices according to a preset proportion as the training voice;
   wherein the preset proportion indicates proportions of voices with different emotions or speech speeds in the training voice.

8. The method according to claim 1, wherein
a quantity of the one or more synthesized voices is a first quantity, wherein the first quantity is determined by the electronic device according to the second similarity, and a lower second similarity indicates a greater first quantity.

9. An electronic device, comprising: one or more processors, one or more memories, and a display screen; the one or more memories being coupled to the one or more processors, the one or more memories being configured to store computer program code, the computer program code comprising a computer instruction, the one or more processors, when executing the computer instruction, causing the electronic device to perform the following steps:
   detecting a first voice instruction, and outputting a first result, wherein the first result does not indicate that voiceprint recognition is successful; and
   detecting a second voice instruction, and outputting a second result, the second result indicating that voiceprint recognition is successful;
   the first voice instruction and the second voice instruction both comprising a voiceprint feature of a user in a same state;
   before the detecting a second voice instruction, the steps further comprise:
   acquiring one or more third voices of the user, wherein the electronic device comprises a first voiceprint model;
   determining that the electronic device is in one or more of the following states: an idle state, a charging state, within a preset update time range, or a battery level being greater than a threshold;
   training the first voiceprint model based on the one or more third voices to obtain a second voiceprint model, wherein the training the first voiceprint model based on the one or more third voices to obtain the second voiceprint model comprises:
      acquiring a text corresponding to the one or more third voices, and a third voiceprint feature;
      generating one or more synthesized voices according to the text and the third voiceprint feature, a text corresponding to the one or more synthesized voices being the same as the text corresponding to the one or more third voices, a similarity between a voiceprint feature of the one or more synthesized voices and the third voiceprint feature being greater than a third value; and
      training the first voiceprint model by using a training voice, to obtain the second voiceprint model, wherein the training voice comprises at least part of the one or more third voices or at least part of the one or more synthesized voices; and
   generating a first user representation according to a fourth voice of the user by using the second voiceprint model, wherein the first user representation indicates a voiceprint feature of the user, wherein the second voiceprint model and the first user representation are used by the electronic device to perform voiceprint recognition on the second voice instruction.

10. The electronic device according to claim 9, wherein the steps comprise:
   after the detecting a second voice instruction:
   recognizing, a voice corresponding to the second voice instruction, and performing an operation corresponding to the voice, wherein
   the operation comprise at least one of the following: waking up a voice assistant, controlling the voice assistant to perform a corresponding operation, or logging in to an account of the user.

11. The electronic device according to claim 10, wherein the steps comprise:
   before the training, the first voiceprint model based on the one or more third voices, generating a second user representation according to a fifth voice of the user by using the first voiceprint model, wherein the second user representation indicates a voiceprint feature of the user, the second user representation being different from the first user representation; and
   the acquiring one or more third voices of the user comprises:
      detecting, by the electronic device, a sixth voice;
      acquiring, by the electronic device, a second voiceprint feature from the sixth voice, and obtaining a second speaker representation according to the second voiceprint feature by using the first voiceprint model; and
      determining the corresponding sixth voice when a second similarity between the second speaker representation and the second user representation is greater than a second value as the one or more third voices of the first user;
      wherein the fourth voice comprises one or more of the following voices: the third voice, the fifth voice, and a voice that the electronic device prompts the user to actively register.

12. The electronic device according to claim 9, wherein the steps comprise:
   before the training the first voiceprint model based on the one or more third voices enabling, a function for updating the first voiceprint model.

13. The electronic device according to claim 9, wherein the steps comprise:
   after the detecting the second voice instruction and before the outputting the second result indicating that voiceprint recognition is successful, acquiring a first voiceprint feature from the second voice instruction, obtaining a first speaker representation according to the first voiceprint feature by using the second voiceprint model, and determining that voiceprint recognition is successful in response to determining that a first similarity between the first speaker representation and the first user representation is greater than a first value.

14. The electronic device according to claim 9, wherein the generating one or more synthesized voices according to the text and the third voiceprint feature comprises:
   generating the one or more synthesized voices according to a voice control parameter, the text, and the third voiceprint feature, wherein the voice control parameter comprises at least one of an emotion parameter or a speech speed parameter, an emotion of the one or more synthesized voices is the same as an emotion indicated by the emotion parameter, a text corresponding to one or more synthesized voices is the same as the text corresponding to the one or more third voices, and a similarity between the voiceprint feature of the one or more synthesized voices and the third voiceprint feature is greater than a third value.

15. The electronic device according to claim 14, wherein the training, the first voiceprint model by using the training voice comprises:
   selecting the at least part of the one or more third voices or the at least part of the one or more synthesized voices according to a preset proportion as the training voice;

wherein the preset proportion indicates proportions of voices with different emotions or speech speeds in the training voice.

16. The electronic device according to claim 9, wherein a quantity of the one or more synthesized voices is a first quantity, wherein the first quantity is determined by the electronic device according to the second similarity, and a lower second similarity indicates a greater first quantity.

17. The electronic device according to claim 9, wherein the steps comprise:

after the detecting the second voice instruction, determining, a text of the second voice instruction as a specific text, the specific text comprising one or more of the following: a wakeup word, a word corresponding to a preset voice instruction, or a word inputted by voice during account login.

18. A non-transitory computer-readable storage medium, comprising a computer instruction, the computer instruction, when run on an electronic device, causing the electronic device to perform the following steps:

detecting a first voice instruction, and outputting a first result, wherein the first result does not indicate that voiceprint recognition is successful; and detecting a second voice instruction, and outputting a second result, the second result indicating that voiceprint recognition is successful;

the first voice instruction and the second voice instruction both comprising a voiceprint feature of a user in a same state;

before the detecting a second voice instruction, the steps further comprise:

acquiring one or more third voices of the user, wherein the electronic device comprises a first voiceprint model;

determining that the electronic device is in one or more of the following states: an idle state, a charging state, within a preset update time range, or a battery level being greater than a threshold;

training the first voiceprint model based on the one or more third voices to obtain a second voiceprint model, wherein the training the first voiceprint model based on the one or more third voices to obtain the second voiceprint model comprises:

acquiring a text corresponding to the one or more third voices, and a third voiceprint feature;

generating one or more synthesized voices according to the text and the third voiceprint feature, a text corresponding to the one or more synthesized voices being the same as the text corresponding to the one or more third voices, a similarity between a voiceprint feature of the one or more synthesized voices and the third voiceprint feature being greater than a third value; and training the first voiceprint model by using a training voice, to obtain the second voiceprint model, wherein the training voice comprises at least part of the one or more third voices or at least part of the one or more synthesized voices; and generating a first user representation according to a fourth voice of the user by using the second voiceprint model, wherein the first user representation indicates a voiceprint feature of the user, wherein the second voiceprint model and the first user representation are used by the electronic device to perform voiceprint recognition on the second voice instruction.

* * * * *